US012023940B2

(12) United States Patent
Kageyama

(10) Patent No.: US 12,023,940 B2
(45) Date of Patent: Jul. 2, 2024

(54) THERMAL PRINT HEAD, MANUFACTURING METHOD OF THE SAME, AND THERMAL PRINTER

(71) Applicant: ROHM CO., LTD., Kyoto (JP)

(72) Inventor: Satoshi Kageyama, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 113 days.

(21) Appl. No.: 17/961,009

(22) Filed: Oct. 6, 2022

(65) Prior Publication Data

US 2023/0036070 A1 Feb. 2, 2023

Related U.S. Application Data

(63) Continuation of application No. PCT/JP2021/015054, filed on Apr. 9, 2021.

(30) Foreign Application Priority Data

Apr. 10, 2020 (JP) ................................ 2020-071002

(51) Int. Cl.

*B41J 2/345* (2006.01)
*B41J 2/325* (2006.01)
*B41J 2/335* (2006.01)

(52) U.S. Cl.

CPC ......... *B41J 2/3355* (2013.01); *B41J 2/33515* (2013.01); *B41J 2/33525* (2013.01); *B41J 2/3353* (2013.01); *B41J 2/33535* (2013.01); *B41J 2/3354* (2013.01); *B41J 2/3357* (2013.01); *B41J 2/3359* (2013.01); *B41J 2/345* (2013.01);

(Continued)

(58) Field of Classification Search

CPC .. B41J 2/3355; B41J 2/33515; B41J 2/33525; B41J 2/3353; B41J 2/33535; B41J 2/3354; B41J 2/3357; B41J 2/3359; B41J 2/345; B41J 2/325; B41J 2/3351; B41J 2/3352

See application file for complete search history.

(56) References Cited

U.S. PATENT DOCUMENTS

2014/0232807 A1* 8/2014 Masutani .............. B41J 2/3355
347/203
2019/0061371 A1* 2/2019 Ishii .................... B41J 2/33515

FOREIGN PATENT DOCUMENTS

JP S60-42069 A 3/1985
JP S63-257653 A 10/1988

(Continued)

*Primary Examiner* — Yaovi M Ameh

(74) *Attorney, Agent, or Firm* — Rabin & Berdo. P.C.

(57) ABSTRACT

A thermal print head includes a head substrate (11) having a main surface (**11*a*) on which a convex part (12) is formed, a resistor layer (21) that is formed on the main surface (11*a*) and the convex part (12), a wiring layer (22) that covers the resistor layer (21) such that the resistor layer (21) is exposed at a heat generating part (20) formed at a part of the convex part (12), and a protective layer (25) that is formed on the main surface (11*a*) of the head substrate (11) and covers the resistor layer (21) and the wiring layer (22). The resistor layer (21**) has a main resistor layer that contains tantalum, and at least one of a first sub-resistor layer that contains tantalum nitride and is stacked below the tantalum layer and a second sub-resistor layer that contains tantalum nitride and is stacked on the tantalum layer. The nitrogen content of tantalum nitride contained in the first sub-resistor layer and the second sub-resistor layer exceeds a predetermined value such that the tantalum nitride is deposited in a stable structure.

16 Claims, 12 Drawing Sheets

(52) U.S. Cl.
CPC .............. *B41J 2/325* (2013.01); *B41J 2/3351* (2013.01); *B41J 2/3352* (2013.01)

(56) References Cited

FOREIGN PATENT DOCUMENTS

| | | | | | |
|---|---|---|---|---|---|
| JP | S63257653 | A | * | 10/1988 | ................ B41J 3/20 |
| JP | H04-93262 | A | | 3/1992 | |
| JP | 2017-114057 | A | | 6/2017 | |
| WO | WO-2012086558 | A1 | * | 6/2012 | ............ B41J 2/3351 |

* cited by examiner

THERMAL PRINT HEAD, MANUFACTURING METHOD OF THE SAME, AND THERMAL PRINTER

CROSS-REFERENCE TO RELATED APPLICATION

This disclosure is a continuation application of International Application No. PCT/JP2021/015054, filed on Apr. 9, 2021, which claims the priority of Japanese Patent Application No. 2020-071002, filed on Apr. 10, 2020, the entire contents of which are incorporated by reference herein.

TECHNICAL FIELD

The present invention relates to a thermal print head, a manufacturing method of the same, and a thermal printer. More specifically, the present invention relates to use of a material containing tantalum and nitrogen to form a resistor layer.

BACKGROUND ART

Conventionally, there has been provided a thermal print head in which a glaze layer is disposed on the surface of a ceramic substrate, a partial glaze layer is further provided on a part of the surface of the glaze layer, a heating resistance layer is provided to span from the glaze layer to the partial glaze layer, and conductors are provided on the surface of the heating resistance layer with a heating region of the heating resistance layer therebetween (see Patent Literature 1). There has also been provided a thermal print head in which anisotropic etching is performed on a semiconductor substrate to form a top surface having an inclined side surface inclined with respect to a main surface, and an insulating layer, a resistor layer, a wiring layer, an insulating protective layer, and the like are formed on the semiconductor substrate in this order (see Patent Literature 2).

The resistor layer of this kind of thermal print head is sometimes made of tantalum nitride. In order to ensure electrical conduction, $Ta_2N$ with a relatively low concentration of nitrogen has sometimes been used for tantalum nitride (see Patent Literatures 3 and 4).

CITATION LIST

Patent Literature

Patent Literature 1: JP 560-42069 A
Patent Literature 2: JP 2017-114057 A
Patent Literature 3: JP S63-257653 A
Patent Literature 4: JP H4-93262 A

SUMMARY

Technical Problem

However, when a resistor layer is made of tantalum nitride containing a low concentration of nitrogen, oxygen diffuses into the resistor layer from the adjacent insulating layer and protective layer. Therefore, the characteristics of the resistor layer are sometimes degraded, with there being, for example, an increase in the resistivity.

The present disclosure is proposed in view of the above described problems, and a purpose of this disclosure is to provide a thermal print head, a manufacturing method of the same, and a thermal printer. The thermal print head includes a resistor layer that is made of tantalum and nitrogen and causes a reduction in diffusion of oxygen from adjacent layers to suppress degradation in characteristics.

Solution to Problem

To solve the above problems, a thermal print head according to the present application includes: a substrate having a main surface on which a convex part is formed; a resistor layer that is formed on the main surface and the convex part; a wiring layer that covers the resistor layer such that the resistor layer is exposed at a heat generating part formed at a part of the convex part; and a protective layer that is formed on the main surface of the substrate and covers the resistor layer and the wiring layer, in which the resistor layer includes: a main resistor layer that contains tantalum; and at least one of a first sub-resistor layer that contains tantalum nitride and is stacked below the main resistor layer and a second sub-resistor layer that contains tantalum nitride and is stacked on the main resistor layer, and the tantalum nitride contained in the first sub-resistor layer and the second sub-resistor layer has an eutectic crystal having a (111)- and (200)-oriented face-centered cubic lattice structure.

A thermal printer according to the present application has the thermal print head; and a platen that is arranged to face a heat generating part of the thermal print head.

A manufacturing method of a thermal print head according to the present application includes steps of: providing a substrate having a main surface on which a convex part is formed; forming a resistor layer that is formed on the main surface and the convex part; forming a wiring layer that covers the resistor layer such that the resistor layer is exposed at a heat generating part formed at a part of the convex part; and forming a protective layer that is formed on the main surface of the substrate and covers the resistor layer and the wiring layer, in which the resistor layer includes: a main resistor layer that contains tantalum; and at least one of a first sub-resistor layer that contains tantalum nitride and is stacked below the main resistor layer and a second sub-resistor layer that is stacked on the main resistor layer, and the tantalum nitride contained in the first sub-resistor layer and the second sub-resistor layer has an eutectic crystal having a (111)- and (200)-oriented face-centered cubic lattice structure.

Effects

According to this disclosure, it is possible to reduce the diffusion of oxygen from the adjacent insulating layer and protective layer into the resistor layer made of tantalum and nitrogen and suppress degradation in the characteristics of the resistor layer due to the diffusion of oxygen.

DESCRIPTION OF EMBODIMENTS

Figure 1:
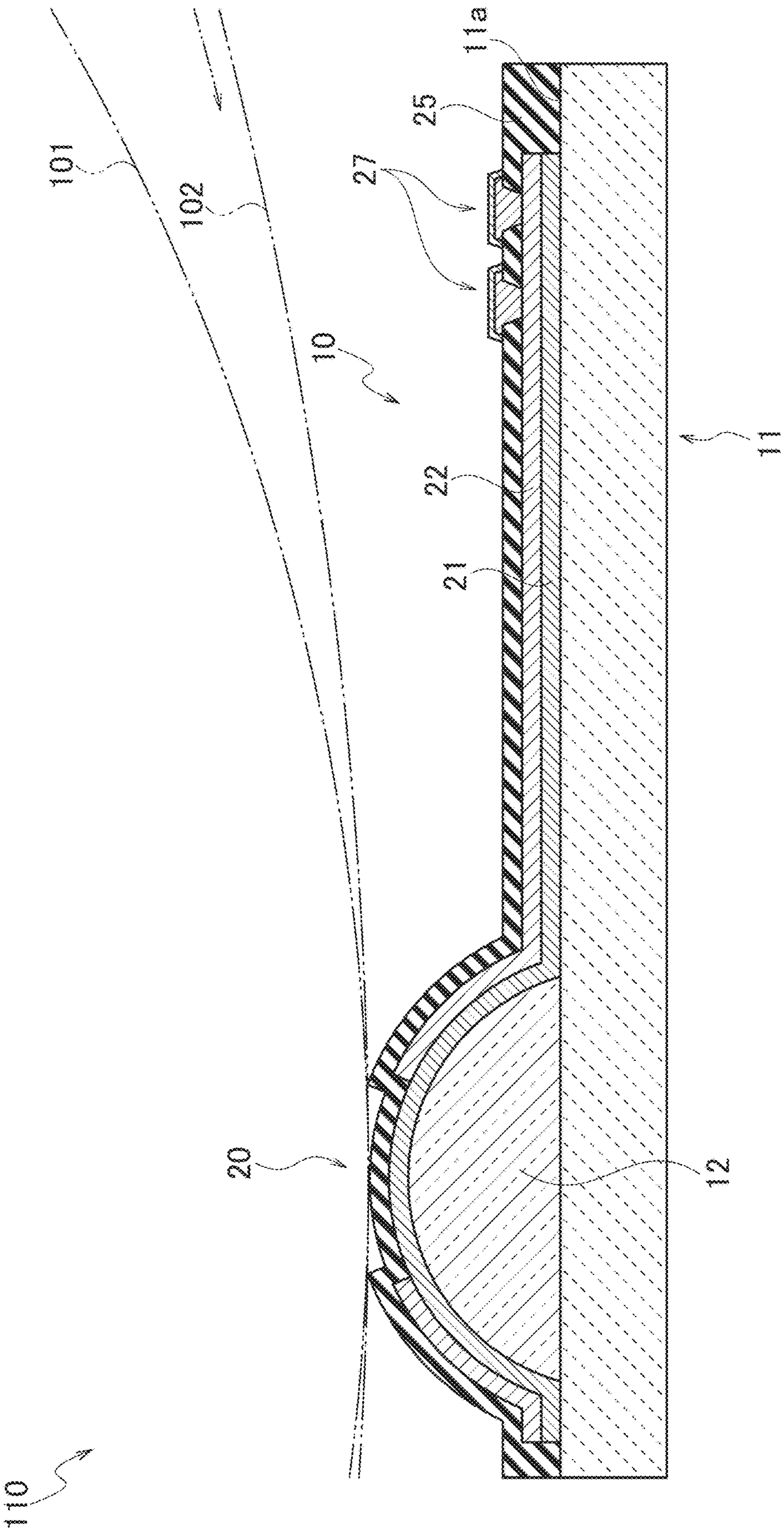
FIG. 1 is a cross-sectional view of a head substrate of a thermal print head of a first embodiment.

Hereafter, a thermal print head, a manufacturing method of the same, and a thermal printer will be described in detail with reference to the drawings. The disclosed embodiments are all for illustrative purposes and embodiments are not limited to the embodiments described in the present specification, and it is needless to say that various aspects are included to the extent obvious to those skilled in the art.

All of the drawings used in the following descriptions are schematic. These drawings are sometimes omitted as appropriate and exaggerated as appropriate for ease of understanding. When describing either side of a drawing, it is assumed that the drawing is viewed with the drawing placed such that reference numerals in the drawing are upright.

First Embodiment

A thermal print head of a first embodiment includes: a substrate having a main surface on which a convex part is formed; a resistor layer that is formed on the main surface and the convex part; a wiring layer that covers the resistor layer such that the resistor layer is exposed at a heat generating part formed at a part of the convex part; and a protective layer that is formed on the main surface of the substrate and covers the resistor layer and the wiring layer, in which the resistor layer includes: a main resistor layer that contains tantalum; and at least one of a first sub-resistor layer that contains tantalum nitride and is stacked below the main resistor layer and a second sub-resistor layer that contains tantalum nitride and is stacked on the main resistor layer, and the tantalum nitride contained in the first sub-resistor layer and the second sub-resistor layer has an eutectic crystal having a (111)- and (200)-oriented face-centered cubic lattice structure. The first sub-resistor layer and the second sub-resistor layer cause a reduction in the diffusion of oxygen from the adjacent substrate and protective layer to the main resistor layer of the resistor layer. Accordingly, it is possible to suppress degradation in the characteristics of the resistor layer due to the diffusion of oxygen.

The resistor layer may include both the first sub-resistor layer and the second sub-resistor layer. The first sub-resistor layer and the second sub-resistor layer cause a reduction in the diffusion of oxygen from the adjacent substrate and protective layer to the tantalum layer of the resistor layer.

The protective layer may contain at least one of silicon nitride and silicon oxide. The protective layer can cover the resistor layer and the wiring layer and electrically and mechanically isolate the resistor layer and the wiring layer.

The wiring layer may contain copper. Copper has high electrical conductivity, allowing a current to flow therethrough with low loss.

The thermal print head further includes: an auxiliary resistor layer that is stacked between the resistor layer and the wiring layer, in which the wiring layer covers the auxiliary resistor layer such that the auxiliary resistor layer is exposed at the heat generating part, and the exposed auxiliary resistor layer covers the resistor layer such that the resistor layer is exposed at a part of the auxiliary resistor layer. The efficiency of heat generation can be further enhanced by means of the auxiliary resistor.

The auxiliary resistor layer may contain titanium. Titanium formed in a thin film can generate heat as a resistor.

The substrate may be a ceramic substrate and the convex part may be formed by using a glass glaze layer. The ceramic substrate provides electrical insulation, and the glass glaze layer can store heat generated from the resistor layer and the auxiliary resistor layer.

The heat generating part may be formed in an area including the top of the convex part. Paper can easily reach the heat generating part.

The main resistor layer may contain 22 atm % or less of nitrogen, and the tantalum and nitrogen contained in the main resistor layer may form a body-centered cubic lattice structure. This kind of main resistor layer containing an extremely low concentration of nitrogen has low resistivity and can be used to generate heat by causing a large current to flow therethrough.

The thermal printer of the first embodiment has the thermal print head and a platen arranged to face the heat generating part of the thermal print head. Degradation in characteristics of the resistor of the thermal print head is suppressed. Therefore, it is possible to provide a thermal printer with stable performance.

A manufacturing method of a thermal print head of the first embodiment includes steps of: providing a substrate having a main surface on which a convex part is formed; forming a resistor layer that is formed on the main surface and the convex part; forming a wiring layer that covers the resistor layer such that the resistor layer is exposed at a heat generating part formed at a part of the convex part; and forming a protective layer that is formed on the main surface of the substrate and covers the resistor layer and the wiring layer, in which the resistor layer includes: a main resistor layer that contains tantalum; and at least one of a first sub-resistor layer that contains tantalum nitride and is stacked below the main resistor layer and a second sub-resistor layer that contains tantalum nitride and is stacked on the main resistor layer, and the tantalum nitride contained in the first sub-resistor layer and the second sub-resistor layer has an eutectic crystal having a (111)- and (200)-oriented face-centered cubic lattice structure. The first and second sub-resistor layers cause a reduction in the diffusion of oxygen from the adjacent substrate and protective layer to the tantalum layer of the resistor layer. Accordingly, it is possible to suppress degradation in the characteristics of the resistor layer due to the diffusion of oxygen.

In the step of forming the resistor layer, the main resistor layer and at least one of the first sub-resistor layer and the second sub-resistor layer may be deposited by controlling a flow rate of a nitrogen gas in a chamber. It is easy to perform the step because it is sufficient if the flow rate of a nitrogen gas is controlled.

The manufacturing method a thermal print head further includes: a step of forming an auxiliary resistor layer so as to be stacked between the resistor layer and the wiring layer before the step of forming the wiring layer and after the step of forming the resistor layer, in which in the step of forming the wiring layer, the wiring layer covers the auxiliary resistor layer such that the auxiliary resistor layer is exposed at the heat generating part, and in the step of forming the auxiliary resistor layer, the auxiliary resistor layer covers the resistor layer such that the resistor layer is exposed at a part of the exposed auxiliary resistor layer. The efficiency of heat generation can be further enhanced by means of the auxiliary resistor.

The step of providing the substrate may further include a step of providing a ceramic substrate and a step of forming a convex part on a main surface of the ceramic substrate by using a glass glaze layer. The ceramic substrate provides electrical insulation, and the glass glaze layer can store heat generated from the resistor layer and the auxiliary resistor layer.

FIG. 1 is a cross-sectional view showing the schematic structure of a head substrate 11 of a thermal print head 10 of a first embodiment. In the thermal print head 10 of the first embodiment, a convex part 12 formed by means of a glass glaze layer is formed on a flat main surface 11*a* of the head substrate 11 made of ceramics such as alumina. The convex part 12 extends in one direction on the main surface 11*a*. The convex part 12 may have a round-shaped cross section. The head substrate 11 may be formed of other types of ceramics such as aluminum nitride (AlN) instead of alumina. A resistor layer 21 made of tantalum and nitrogen is formed on the main surface 11*a* and the convex part 12, across the convex part 12.

A wiring layer 22 covers the resistor layer 21 such that the resistor layer 21 is exposed at the plurality of heat generating parts 20 formed at a part of the convex part 12. The plurality of heat generating parts 20 each have a rectangular planar shape and are arranged along the direction from the front to the back in FIG. 1. The plurality of heat generating parts 20 may be formed in a predetermined area including the top of the convex part 12. The wiring layer 22 is formed of metal such as copper. The wiring layer 22 may be formed by stacking copper on titanium or an alloy of copper and titanium. The wiring layer 22 has independent wiring connected to each of the plurality of heat generating parts 20. The wiring layer 22 transmits the current supplied from an external electrode 27, and supplies the current to the resistor layer 21 exposed at the plurality of heat generating parts 20, from both sides via the independent wiring.

A protective layer 25 is formed of an insulator such as silicon oxide and is formed to cover the resistor layer 21 and the wiring layer 22 on the main surface 11*a* of the head substrate 11. The protective layer 25 may be formed of other types of insulators such as silicon nitride. The external electrode 27 is exposed on the protective layer 25 and is connected to the wiring layer 22 by passing through the protective layer 25.

The head substrate 11 is usually fixed to a heat sink (not shown). The heat sink is a fixing member to which the head substrate 11 is attached. The heat sink is formed of a metal plate (for example, an aluminum plate, a steel plate, or the like).

The thermal print head 10 is fixed to a mounting member (not shown) included in a thermal printer 110, by means of screw fastening or the like. The thermal printer 110 has a roller-shaped platen 101. The platen 101 extends along the direction in which the plurality of heat generating parts 20 of the thermal print head 10 are arranged and extend side by side (along the direction from the front to the back in FIG. 1) and is arranged to face the plurality of heat generating parts 20. When the thermal printer 110 is used, a printing medium 102 (for example, thermal paper) is interposed between the platen 101 and the plurality of heat generating parts 20. The printing medium 102 pressed against the platen 101 moves while being in contact with the plurality of heat generating parts 20. The printing medium 102 moves from the right side to the left side in FIG. 1. A flat platen (including a platen having a curved surface of a large radius of curvature) may be used instead of the roller-shaped platen 101.

Figure 2:
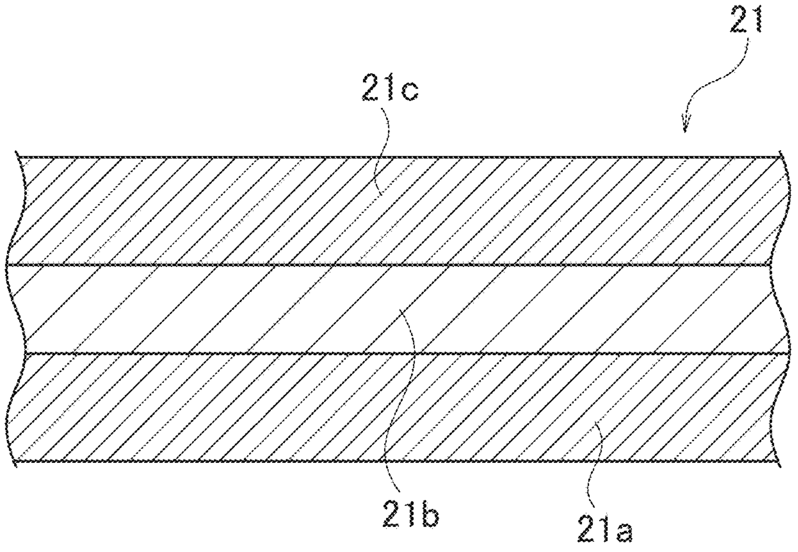
FIG. 2 is a cross-sectional view of a resistor layer of a first embodiment.

As shown in FIG. 2, in the thermal print head 10 of the first embodiment, the resistor layer 21 is formed by stacking a first sub-resistor layer 21*a* containing tantalum nitride, a main resistor layer 21*b* containing tantalum, and a second sub-resistor layer 21*c* containing tantalum nitride in this order. Tantalum contained in the main resistor layer 21*b* forms a body-centered cubic lattice structure (BCC) and may contain extremely a low concentration of nitrogen. This extremely low concentration is 22 atm % or less, for example. Tantalum nitride contained in the first and second sub-resistor layers 21*a* and 21*c* contains an eutectic crystal having a (111)- and (200)-oriented face-centered cubic lattice structure (FCC).

In the resistor layer 21, the main resistor layer 21*b* has a low resistivity, is a major electrical conduction path, and is a dominant factor of the electrical characteristics of the resistor layer 21. In addition, since the main resistor layer 21*b* contains the extremely low concentration of nitrogen, the main resistor layer 21*b* has excellent ductility. Therefore, the main resistor layer 21*b* is not easily disconnected even if a large current is intermittently applied to the main resistor layer 21*b* to heat the heat generating parts 20 such that the cycle of expansion and contraction is repeated.

In the resistor layer 21, the main resistor layer 21*b* is stacked on and electrically connected to the first and second sub-resistor layers 21*a* and 21*c*. Therefore, even if the main resistor layer 21*b* serving as the major electrical conduction path is disconnected, electrical conduction is maintained through the first and second sub-resistor layers 21*a* and 21*c*. Therefore, the entire resistor layer 21 is not easily disconnected.

The resistor layer 21 is formed on the main surface 11*a* of the head substrate 11, and a part thereof is covered by the protective layer 25. The head substrate 11 is made of ceramic, and an oxygen-containing material such as alumina ($Al_2O_3$) is used for the ceramic. Also, although the protective layer 25 is formed of an insulator, an oxygen-containing material such as silicon oxide ($SiO_2$) is sometimes used.

Oxygen atoms may enter the resistor layer 21 from this kind of oxygen-containing material.

In the resistor layer 21, the first sub-resistor layer 21*a* is interposed between the head substrate 11 and the main resistor layer 21*b* to protect the main resistor layer 21*b* from being affected by the head substrate 11. Suppose that oxygen atoms enter the resistor layer 21 from the head substrate 1 which is formed of an oxygen-containing material such as alumina, for example. Even in the above case, the first sub-resistor layer 21*a* acts as a barrier to prevent the oxygen atoms from entering and reaching the main resistor layer 21*b* by retaining the oxygen atoms within the first sub-resistor layer 21*a*.

Further, the second sub-resistor layer 21*c* is interposed between the protective layer 25 and the main resistor layer 21*b* to protect the main resistor layer 21*b* from being affected by the protective layer 25. Suppose that the protective layer 25 is formed of an oxygen-containing material such as silicon oxide, for example. In the above case, even if oxygen atoms enter the resistor layer 21 from the protective layer 25, the second sub-resistor layer 21*c* acts as a barrier to prevent the oxygen atoms from entering and reaching the main resistor layer 21*b* by retaining the oxygen atoms within the second sub-resistor layer 21*c*.

In this way, even if oxygen atoms enter the resistor layer 21 from the head substrate 11 and protective layer 25 which are adjacent to the resistor layer 21, the oxygen atoms are retained in the first and second sub-resistor layers 21*a* and 21*c* and are prevented from entering the main resistor layer 21*b* serving as the dominant factor of the electrical characteristics. Therefore, degradation in the characteristics that occurs due to the entering of oxygen atoms into the main resistor layer 21*b* is reduced, and the electrical characteristics of the thermal print head 10 including the resistor layer 21 are maintained, thereby extending the life of the thermal print head 10. Even if the main resistor layer 21*b* is disconnected, electrical conduction is maintained through the first and second sub-resistor layers 21*a* and 21*c*, thereby extending the life of the thermal print head 10.

Figure 3A:
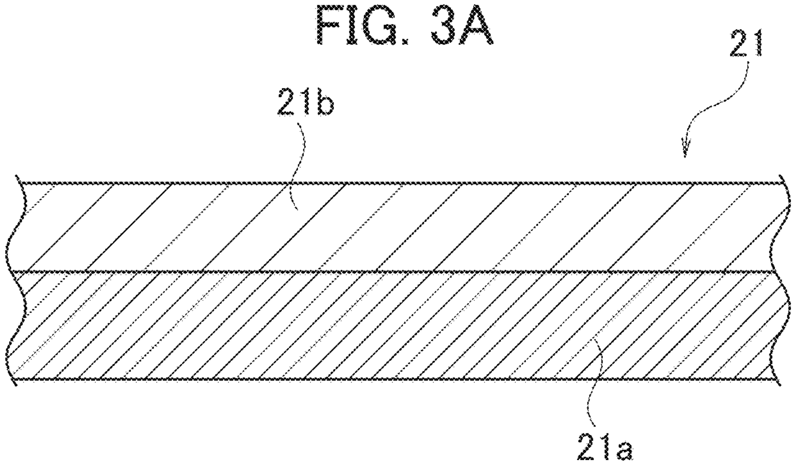
FIGS. 3A and 3B are cross-sectional views showing another aspect of a resistor layer of a first embodiment.
Figure 3B:
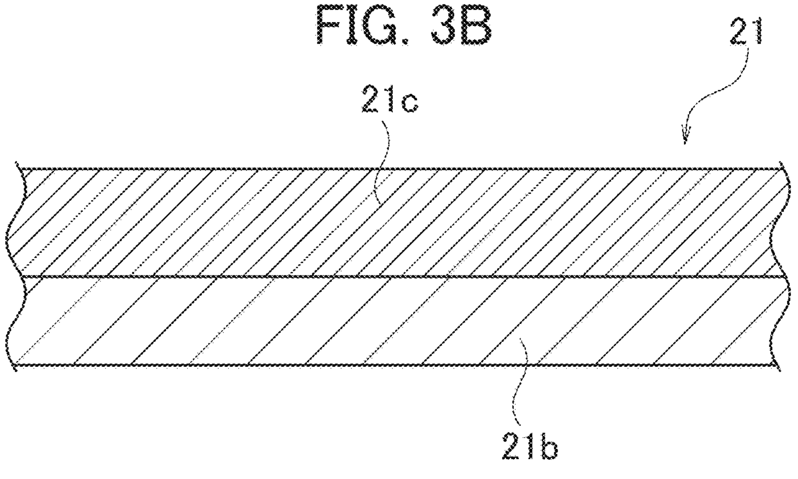

FIGS. 3A and 3B are cross-sectional views showing another aspect of the resistor layer 21. In FIG. 2, the resistor layer 21 is formed by stacking the first sub-resistor layer 21*a*, the main resistor layer 21*b*, and the second sub-resistor layer 21*c* in this order, but the structure is not limited to this kind of structure. The first sub-resistor layer 21*a* and the second sub-resistor layer 21*c* may be provided only on one side where oxygen atoms may enter the resistor layer 21 from an adjacent layer.

FIG. 3A is a cross-sectional view showing the resistor layer 21 formed by stacking the main resistor layer 21*b* on the first sub-resistor layer 21*a*. Suppose that ceramic of the head substrate 11 (see FIG. 1) contains alumina ($Al_2O_3$) containing oxygen and the protective layer 25 (see FIG. 1) contains silicon nitride (SiN) containing no oxygen, for example. In the above case, it is possible that oxygen atoms enter the resistor layer 21 from the head substrate 11, but no oxygen atoms are supplied from the protective layer 25. Therefore, as a barrier to prevent oxygen atoms from entering the main resistor layer 21*b*, the first sub-resistor layer 21*a* may be provided so as to be interposed between the head substrate 11 and the main resistor layer 21*b*. The main resistor layer 21*b* may directly contact the protective layer 25 without the second sub-resistor layer 21*c* being interposed between the main resistor layer 21*b* and the protective layer 25.

In such a case, even if oxygen atoms enter the resistor layer 21 from the head substrate 11, oxygen atoms are retained in the first sub-resistor layer 21*a* and are prevented from reaching the main resistor layer 21*b* serving as the dominant factor of the electrical characteristics. Therefore, the electrical characteristics of the thermal print head 10 including the resistor layer 21 are maintained, thereby extending the life of the thermal print head 10.

FIG. 3B is a cross-sectional view showing the resistor layer 21 formed by stacking the second sub-resistor layer 21*c* on the main resistor layer 21*b*. Suppose that ceramic of the head substrate 11 (see FIG. 1) contains aluminum nitride (AlN) containing no oxygen and the protective layer 25 (see FIG. 1) contains silicon oxide ($SiO_2$) containing oxygen, for example. In the above case, oxygen atoms may enter the resistor layer 21 from the protective layer 25 although no oxygen atoms are supplied from the head substrate 11. Therefore, as a barrier to prevent oxygen atoms from entering the main resistor layer 21*b*, the second sub-resistor layer 21*c* may be provided so as to be interposed between the main resistor layer 21*b* and the protective layer 25. The main resistor layer 21*b* may directly contact the head substrate 11 without the first sub-resistor layer 21*a* being interposed between the main resistor layer 21*b* and the protective layer 25.

In such a case, even if oxygen atoms enter the resistor layer 21 from the protective layer 25, oxygen atoms are retained in the second sub-resistor layer 21*c* and prevented from reaching the main resistor layer 21*b* serving as the dominant factor of the electrical characteristics. Therefore, the electrical characteristics of the thermal print head 10 including the resistor layer 21 are maintained, thereby extending the life of the thermal print head 10.

In this way, even if the resistor layer 21 is formed by stacking only one of the first and second sub-resistor layers 21*a* and 21*c* on the main resistor layer 21*b*, the main resistor layer 21*b* is electrically connected to one of the first and second sub-resistor layers 21*a* and 21*c*. Therefore, even if the main resistor layer 21*b* serving as the major electrical conduction path is disconnected, electrical conduction is maintained through one of the first and second sub-resistor layers 21*a* and 21*c*. Therefore, the entire resistor layer 21 is not easily disconnected and accordingly the life of the thermal print head 10 including the resistor layer 21 is extended.

The thermal printer 110 may be configured by incorporating the thermal print head 10 of the first embodiment. This kind of thermal printer 110 has the thermal print head 10 and the platen 101 arranged to face the heat generating parts 20 of the thermal print head 10. Since the life the thermal print head 10 of the first embodiment is extended, the life of the thermal printer 110 configured by incorporating this kind of thermal print head 10 can also be extended.

Figure 4:
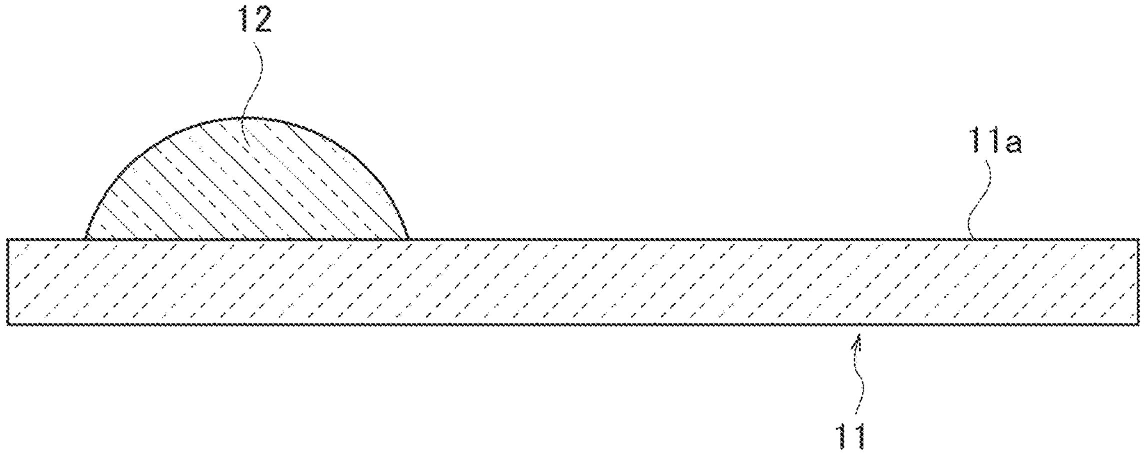
FIG. 4 is a process flow diagram of a thermal print head of a first embodiment.
Figure 5:
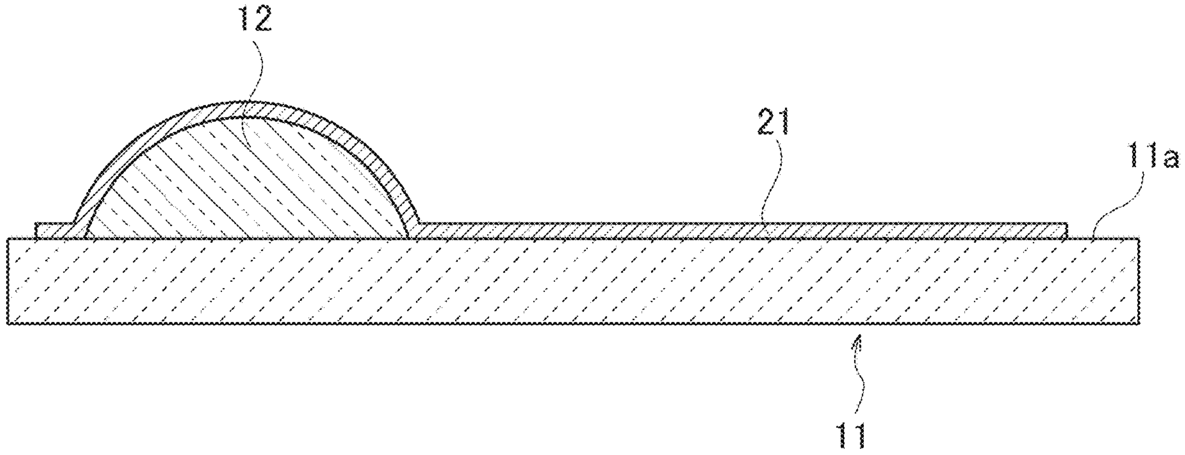
FIG. 5 is a process flow diagram of a thermal print head of a first embodiment.

FIGS. 4 and 5 are process flow diagrams of the thermal print head 10 of the first embodiment. In the process shown in FIG. 4, the head substrate 11 is shown which is made of ceramics such as alumina and has the flat main surface 11*a*. A glass glaze layer of the convex part 12 which extends in one direction and is formed on the main surface 11*a* of the head substrate 11 is formed by means of printing or the like. The glass glaze layer is formed by firing a screen-printed glass paste on the main surface 11*a*, for example. The head substrate 11 may be made by using other types of ceramics instead of alumina. FIGS. 4 and 5 show one head substrate 11 corresponding to one thermal print head 10. In practice, a ceramic substrate having a rectangular planar shape when viewed along the thickness direction of the head substrate 11 (when viewed as a plan view) includes a plurality of head substrates 11 in a lattice shape, for example. In other words, the ceramic substrate is a ceramic wafer.

In the process shown in FIG. 5, the resistor layer 21 is formed across the main surface 11*a* and the convex part 12 of the head substrate 11. As shown in FIG. 2, the resistor layer 21 is formed by stacking the first sub-resistor layer 21*a*, the main resistor layer 21*b*, and the second sub-resistor layer 21*c* in this order.

In this process, the head substrate 11 in which the convex part 12 is formed on the main surface 11*a* in the process shown in FIG. 4 is stored in a chamber. A mixed gas of a nitrogen gas of a raw material gas and an argon gas of a carrier gas flows into the chamber. Tantalum nitride is deposited on the main surface 11*a* and the convex part 12 by sputtering tantalum as a target. The first sub-resistor layer 21*a* and the second sub-resistor layer 21*c* containing a high concentration of nitrogen are deposited by adjusting the flow rate of a nitrogen gas in a mixed gas so as to increase. In addition, the supply of the nitrogen gas is stopped, only an argon gas is allowed to flow, tantalum is sputtered, and the main resistor layer 21*b* is deposited.

When sputtering is performed, the flow rate of the nitrogen gas is adjusted in the order of depositing, such that the first sub-resistor layer 21*a*, the main resistor layer 21*b*, and the second sub-resistor layer 21*c* are deposited while the head substrate 11 is stored in the chamber. Therefore, in the process of depositing the main resistor layer 21*b*, the nitrogen gas supplied in the process of depositing the first sub-resistor layer 21*a* may remain in the chamber, and an extremely low concentration of nitrogen may be contained in the main resistor layer 21*b*.

Figure 6:
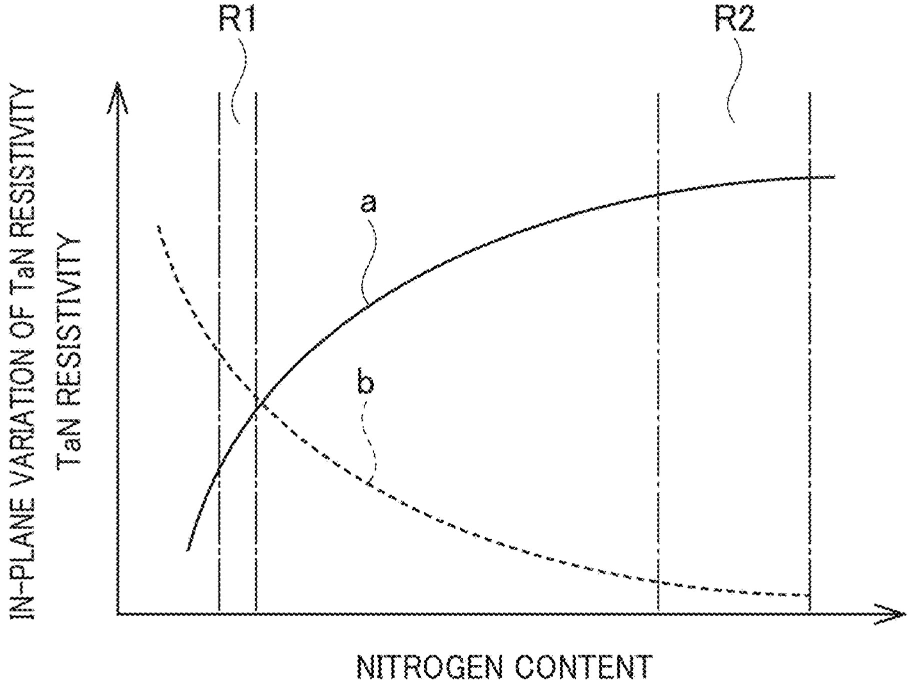
FIG. 6 is a graph showing the relationship between nitrogen content, a tantalum nitride resistivity, and an in-plane variation of the tantalum nitride resistivity.

FIG. 6 is a graph showing the relationship between nitrogen content, the tantalum nitride resistivity, and an in-plane variation of the tantalum nitride resistivity for tantalum nitride deposited by means of sputtering. Curve a in the drawing is the tantalum nitride resistivity, and curve b is the in-plane variation of the tantalum nitride resistivity.

The nitrogen content of the deposited tantalum nitride increases in accordance with the flow rate of a nitrogen gas. The nitrogen content of the horizontal axis can be replaced by the flow rate of a nitrogen gas. The resistivity shown by curve a increases as the nitrogen content or nitrogen gas flow rate increases. Meanwhile, the in-plane variation of the resistivity shown by curve b decreases as the flow rate of a nitrogen gas or the nitrogen content increases.

In the diagram, a first region R1 containing a low concentration of nitrogen corresponds to the main resistor layer 21*a* containing tantalum in the resistor layer 21. The first region R1 has a low resistivity and is used to generate heat by supplying a large current in the heat generating parts 20, but the in-plane variation of the resistivity increases. In this first region R1, tantalum nitride is deposited in an unstable structure such as a body-centered cubic lattice structure. Tantalum nitride is similarly deposited in a body-centered cubic lattice structure even in a region with an even lower nitrogen content than the first region R1.

A second region R2 containing a high concentration of nitrogen exceeding a predetermined concentration of nitrogen corresponds to the first sub-resistor layer 21*b* and the second sub-resistor layer 21*c* containing tantalum nitride of the resistor layer 21. In the second region R2, the in-plane variation of the resistivity is small, and tantalum nitride is deposited in a stable structure, but the resistivity is higher. Therefore, the second region R2 is not suitable to be used for generating heat by supplying a large current thereto.

The second region R2 is a region where a nitrogen gas is oversupplied to the chamber and the increase in the concentration of nitrogen contained in tantalum nitride saturates even if the flow rate of a nitrogen gas increases. Tantalum nitride in the second region R2 is in a stable state such as an eutectic crystal having a (111)- and (200)-oriented face-centered cubic lattice structure in which the concentration of nitrogen contained exceeds a predetermined value. The predetermined value of the nitrogen concentration (a predetermined concentration) corresponds to the lower end of the nitrogen content in the second region R2 (left end in FIG. 6).

Figure 7:
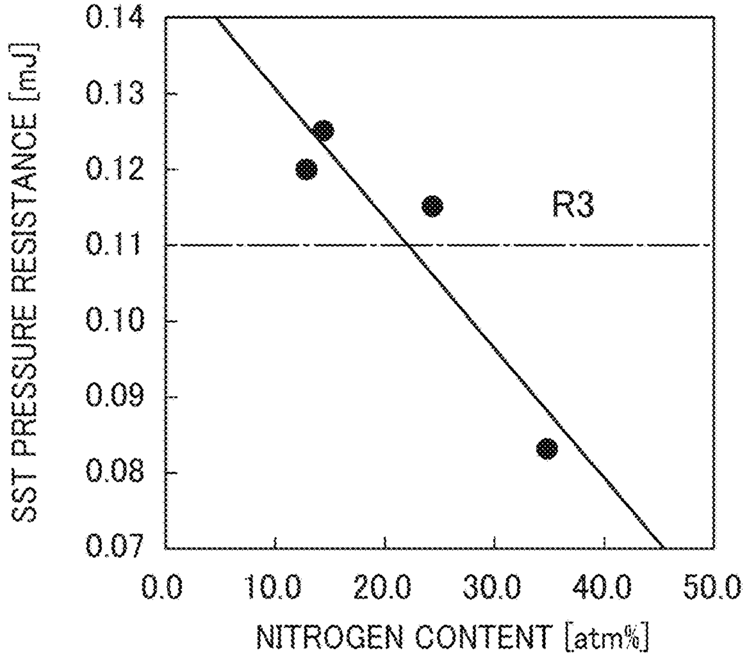
FIG. 7 is a graph showing the relationship between nitrogen content and SST pressure resistance in a resistor layer.

FIG. 7 is a graph showing the relationship between nitrogen content and pressure resistance for tantalum nitride deposited by means of sputtering. This pressure resistance was measured by means of a step stress test (SST). The pressure resistance decreases as nitrogen content increases. If the pressure resistance of a usable third region R3 in the drawing is assumed to be 0.11 mJ or more, the corresponding usable nitrogen content is about 22 atm % or less. Therefore, from the viewpoint of pressure resistance, it is possible to use an extremely low concentration of tantalum nitride with a nitrogen content of about 22 atm % or less.

According to the first embodiment, as shown in FIG. 2, the resistor layer 21 is formed by stacking the first sub-resistor layer 21*a*, the main resistor layer 21*b*, and the second sub-resistor layer 21*c* in this order. Tantalum nitride forming the first sub-resistor layer 21*a* and the second sub-resistor layer 21*c* is in a stable state in which the concentration of nitrogen contained exceeds a predetermined value. The range of nitrogen content may be in the region R2 in FIG. 6. In this region R2, tantalum nitride is deposited in a stable structure formed of an eutectic crystal having a (111)- and (200)-oriented face-centered cubic lattice structure.

In addition, the main resistor layer 21*b* contains tantalum which may contain an extremely low concentration of nitrogen, and the range of nitrogen content may be in the first region R1 of FIG. 6 or in the lower nitrogen content range. In the first region R1 and in the lower nitrogen content range, the variation of resistivity is large, and tantalum nitride is deposited in an unstable structure. The main resistor layer 21*b* is deposited in an unstable structure in this way, but is stacked between the first and second sub-resistor layers 21*a* and 21*c*, which have stable structures. Therefore, the entire first sub-resistor layer 21*a*, the main resistor layer 21*b*, and the second sub-resistor layer 21*c*, which constitute the resistor layer 21 form a stable structure.

The main resistor layer 21*b* among the first sub-resistor layer 21*a*, the main resistor layer 21*b*, and the second sub-resistor layer 21*c* constituting the resistor layer 21, has a low resistivity, becomes a major electrical conduction path, and is a dominant factor of the electrical characteristics of the resistor layer 21. Since the main resistor layer 21*b* contains tantalum which may contain an extremely low concentration of nitrogen, the nitrogen concentration corresponds to the usable third region R3 shown in FIG. 7. Therefore, the pressure resistance of the thermal print head 10 including the resistor layer 21 is ensured.

As in another aspect of the resistor layer 21 shown in FIGS. 3A and 3B, the resistor layer 21 may be formed by stacking only one of the first sub-resistor layer 21*a* and the second sub-resistor layer 21*c* on the main resistor layer 21*b*. That is, the resistor layer 21 may be formed by stacking the main resistor layer 21*b* on the first sub-resistor layer 21*a* as shown in FIG. 3A. Alternatively, the resistor layer 21 may be formed by stacking the second sub-resistor layer 21*c* on the main resistor layer 21*b* as shown in FIG. 3B.

In such cases also, the head substrate 11 having the main surface 11*a* on which the convex part 12 is formed is stored in a chamber. A mixed gas of a nitrogen gas of a raw material gas and an argon gas of a carrier gas flows into the chamber, and tantalum nitride is deposited on the main surface 11*a* and the convex part 12 by sputtering tantalum as a target. The first sub-resistor layer 21*a* or the second sub-resistor layer 21*c* containing a high concentration of nitrogen is deposited by adjusting the flow rate of the nitrogen gas in the mixed gas so as to increase. In addition, the supply of the nitrogen gas is stopped, only the argon gas is supplied to sputter tantalum, and the main resistor layer 21*b* is deposited. In these operations, when sputtering is performed, the flow rate of the nitrogen gas is adjusted such that the main resistor layer 21*b* and one of the first and second sub-resistor layers 21*a* and 21*c* are deposited in a predetermined order while the head substrate 11 is stored in the chamber.

In the resistor layer 21, tantalum nitride contained in one of the first sub-resistor layer 21*a* and the second sub-resistor layer 21*c* is in a stable state in which the concentration of nitrogen contained exceeds a predetermined value, and the range of nitrogen content may be in the region R2 in FIG. 6. In this region R2, tantalum nitride is deposited into a stable structure formed of an eutectic crystal having a (111)- and (200)-oriented face-centered cubic lattice structure.

The tantalum layer 21*b* contains tantalum which may contain an extremely low concentration of nitrogen, and the range of nitrogen content may be in the first region R1 of FIG. 6 or in the lower nitrogen content range. In the first region R1 and also in the low nitrogen content range, the variation of resistivity is large, and tantalum nitride is deposited in an unstable structure. Although the main resistor layer 21*b* is deposited in an unstable structure in this way, the main resistor layer 21*b* is stacked with one of the first and second sub-resistor layers 21*a* and 21*c*, which have stable structures. Therefore, the main resistor layer 21*b* and one of the first and second sub-resistor layers 21*a* and 21*c*, which constitute the resistor layer 21, as a whole form a stable structure.

Figure 8:
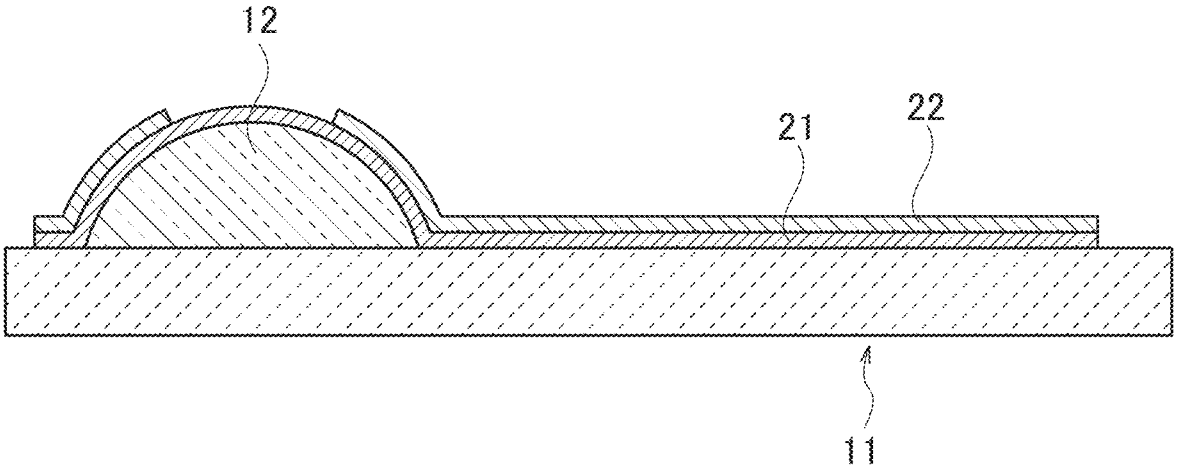
FIG. 8 is a process flow diagram of a thermal print head of a first embodiment.
Figure 9:
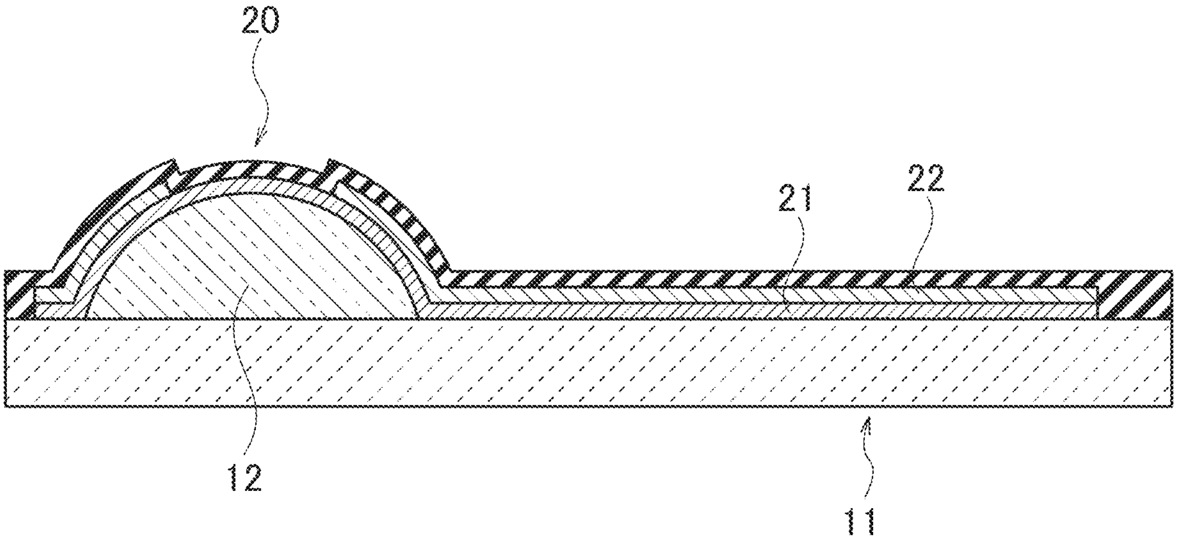
FIG. 9 is a process flow diagram of a thermal print head of a first embodiment.

FIGS. 8 and 9 are process flow diagrams of the thermal print head 10 of the first embodiment. FIGS. 8 and 9 follow on from the process flows shown in FIGS. 4 and 5. In the process shown in FIG. 8, the wiring layer 22 is formed to cover the resistor layer 21 formed across the convex part 12, on the main surface 11*a* of the head substrate 11. The wiring layer 22 is made of a metal such as copper. The wiring layer 22 may be formed by stacking copper on titanium or may be formed on an alloy of copper and titanium. The wiring layer 22 is stopped at a part of the convex part 12 and the resistor layer 21 is exposed at the heat generating parts 20.

In the process shown in FIG. 8, the resistor layer 21 is etched and the plurality of heat generating parts 20 (see FIG. 1) are formed. The plurality of heat generating parts 20 each have a rectangular planar shape and are arranged along the direction from the front to the back in FIG. 8. In the process shown in FIG. 8, the pattern of the wiring layer 22 is formed by means of etching. The pattern of the wiring layer 22 has independent wiring connected to each of the plurality of heat generating parts 20.

In the process shown in FIG. 9, the protective layer 25 is formed on the main surface 11*a* of the head substrate 11 and the convex part 12 so as to cover the resistor layer 21 and the wiring layer 22. The protective layer 25 is formed of an insulator such as silicon nitride. The protective layer 25 may be formed of another insulator such as silicon oxide. Further following the process shown in FIG. 9, the external electrode 27 is formed as shown in FIG. 1, and an individual thermal print head 10 is obtained through the process such as dicing (not shown). The plurality of head substrates 11 are fabricated from a ceramic substrate having a rectangular planar shape by performing the process such as dicing.

In the process of forming the resistor layer 21 shown in FIG. 5 of a manufacturing method of the thermal print head 10 of the first embodiment, a nitrogen gas is supplied to a chamber in which tantalum as a target is sputtered and the nitrogen content is controlled by appropriately controlling the flow rate of a nitrogen gas. Compared with the conventional process of forming a resistor by means of sputtering, it is possible to perform the process easily because it is sufficient to merely add an operation to appropriately control the flow rate of nitrogen.

Second Embodiment

A thermal print head of a second embodiment has a substrate having a main surface on which a convex part is formed, a resistor layer formed on the main surface and the convex part, a wiring layer covering the resistor layer such that the resistor layer is exposed at heat generating parts formed at a part of the convex part, and a protective layer which is formed on the main surface of the substrate and covers the resistor layer and the wiring layer. The resistor layer has a main resistor layer containing tantalum, and at least one of a first sub-resistor layer which contains tantalum nitride and is stacked below the main resistor layer and a second sub-resistor layer which contains tantalum nitride and is stacked on the main resistor layer. Tantalum nitride contained in the first and second sub-resistor layers contains an eutectic crystal having a (111)- and (200)-oriented face-centered cubic lattice structure. The first and second sub-resistor layers causes a reduction in the diffusion of oxygen from the adjacent substrate and protective layer to the main resistor layer of the resistor layer. Accordingly, it is possible to suppress degradation in the characteristics of the resistor layer due to the diffusion of oxygen.

The resistor layer may include both the first and second sub-resistor layers. Both of the first and second sub-resistor layers cause a reduction in the diffusion of oxygen from the adjacent substrate and protective layer to the main resistor layer of the resistor layer.

The protective layer may contain at least one of silicon nitride and silicon oxide. The protective layer can cover the resistor layer and the wiring layer and electrically and mechanically isolate the resistor layer and the wiring layer.

The wiring layer may contain copper. Copper has high electrical conductivity, allowing a current to flow with low loss.

An auxiliary resistor layer may be further provided which is stacked between the resistor layer and the wiring layer. The wiring layer may cover the auxiliary resistor layer such that the auxiliary resistor layer is exposed at heat generating parts. The exposed auxiliary resistor layer may cover the resistor layer such that the resistor layer is exposed at some parts. The efficiency of heat generation can be further enhanced by means of the auxiliary resistor.

The thermal printer of the second embodiment has a thermal print head and a platen arranged to face the heat generating parts of the thermal print head. In the thermal print head, degradation in the characteristics of the resistor is suppressed. Accordingly, it is possible to provide a thermal printer with stable performance.

The manufacturing method of the thermal print head of the second embodiment includes a process of providing a substrate having a main surface on which a convex part is formed, a process of forming a resistor layer on the main surface and the convex part, a process of forming a wiring layer covering the resistor layer such that the resistor layer is exposed at heat generating parts formed at a part of the convex part, and a process of forming a protective layer covering the resistor layer and the wiring layer on the main surface of the substrate. The resistor layer has a main resistor layer containing tantalum, and at least one of a first sub-resistor layer which contains tantalum nitride and is stacked below the tantalum layer, and a second sub-resistor layer which contains tantalum nitride and is stacked on the main resistor layer as the tantalum layer. The first and second sub-resistor layers contain an eutectic crystal having a (111)- and (200)-oriented face-centered cubic lattice structure.

The first and second sub-resistor layers reduce the diffusion of oxygen from the adjacent substrate and protective layer to the main resistor layer of the resistor layer. Accordingly, it is possible to suppress degradation in the characteristics of the resistor layer due to the diffusion of oxygen.

In the process of forming the resistor layer, the main resistor layer may be deposited with at least one of the first and second sub-resistor layers by controlling the flow rate of a nitrogen gas in the chamber. It is easy to perform the process because it is sufficient to merely control the flow rate of the nitrogen gas.

The process of forming an auxiliary resistor layer such that the auxiliary resistor layer is stacked between the resistor layer and the wiring layer may be provided before the process of forming the wiring layer and after the process of forming the resistor layer. In the process of forming the wiring layer, the wiring layer may cover the auxiliary resistor layer such that the auxiliary resistor layer is exposed at the heat generating parts. In the process of forming the auxiliary resistor layer, the exposed auxiliary resistor layer may cover the resistor layer such that the resistor layer is exposed at some parts. The efficiency of heat generation can be further enhanced by means of the auxiliary resistor.

The process of providing a substrate further includes a process of providing a semiconductor substrate, a process of forming a convex part on the main surface of the semiconductor substrate by means of anisotropic etching, and a process of forming an insulating layer so as to cover the main surface of the substrate on which the convex part is formed and the convex part. In the process of forming the resistor layer, the resistor layer is formed on the insulating layer. In the process of forming the protective layer, the protective layer may be formed so as to cover the insulating layer, the resistor layer, and the wiring layer. The convex part with an inclined surface can be easily formed by means of anisotropic etching.

The process of forming the convex part includes a process of forming first inclined surfaces sandwiching the top surface of the convex part from both sides by means of first anisotropic etching and a process of forming second inclined surfaces between the top surface and the first inclined surfaces by means of second anisotropic etching. The resistor layer may be formed on at least one of the top surface, the first inclined surfaces, and the second inclined surfaces of the convex part. By having the second inclined surfaces, the paper can slide more smoothly.

Figure 10:
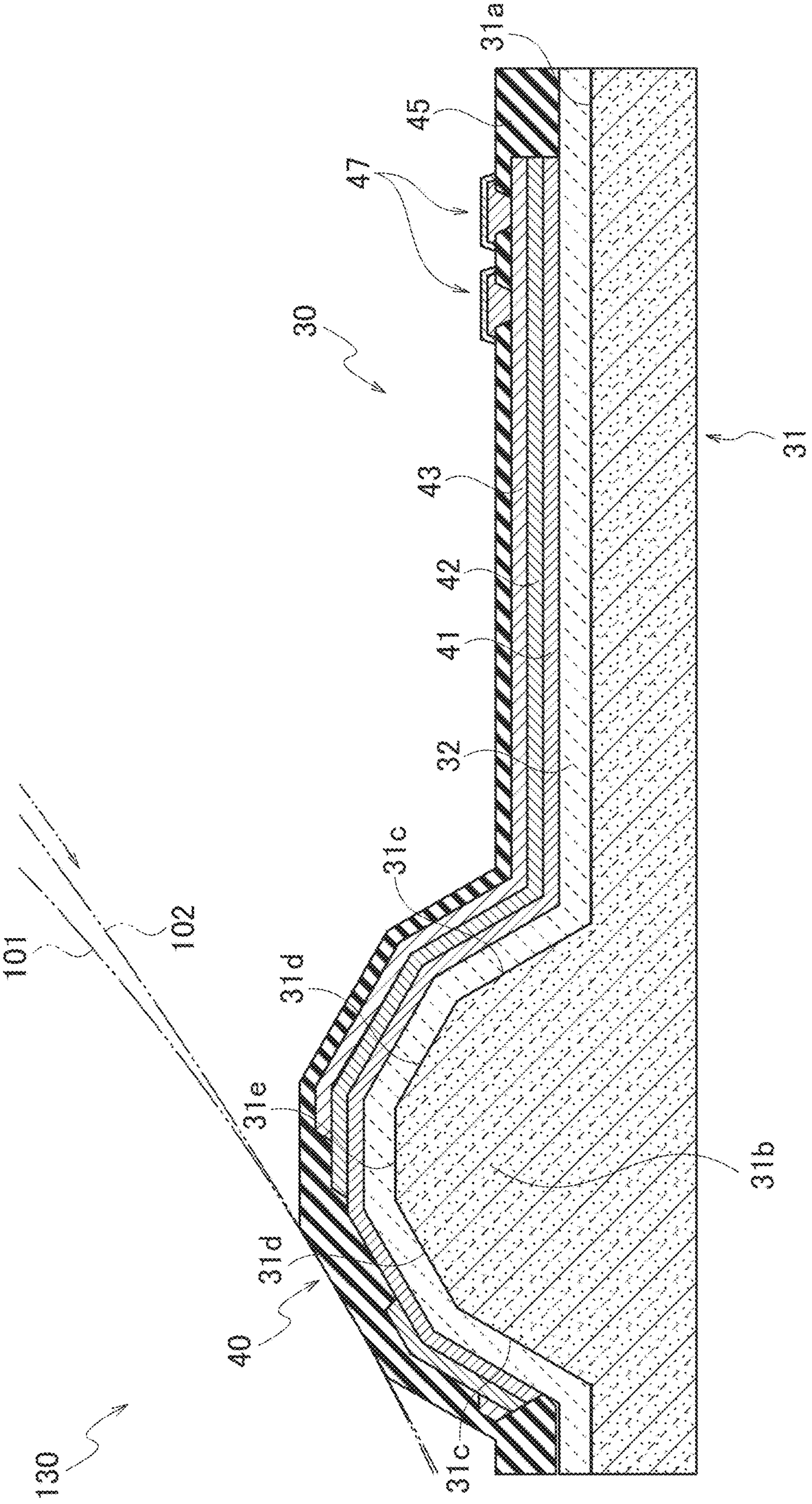
FIG. 10 is a cross-sectional view of a head substrate of a thermal print head of a second embodiment.

FIG. 10 is a cross-sectional view showing the schematic structure of a head substrate 31 of a thermal print head 30 of the second embodiment. In the thermal print head 30 of the second embodiment, a convex part 31*b* is formed by means of anisotropic etching on a flat main surface 31*a* of the head substrate 31 made of a semiconductor such as silicon. The convex part 31*b* extends in one direction on the main surface 31*a* and is sandwiched from both sides by means of first inclined surfaces 31*c* in contact with the main surface 31*a* and second inclined surfaces 31*d* formed between the first inclined surfaces 31*c* and a top surface 31*e* of the convex part 31*b*. Other types of semiconductors such as silicon carbide may be used instead of silicon to form the head substrate 31. The silicon may also be doped with appropriate impurities.

An insulating layer 32 is formed of silicon oxide and covers the main surface 31*a* and the convex part 31*b*. The insulating layer 32 also plays a role of storing heat at heat generating parts 40 and is also referred to as a heat storage layer.

On the main surface 31*a* and the convex part 31*b*, a resistor layer 41 made of tantalum and nitrogen is formed across the convex part 31*b*. Other types of insulators such as silicon nitride may be used instead of silicon oxide to form the insulating layer 32.

An auxiliary resistor layer 42 covers the resistor layer 41 such that the resistor layer 41 is exposed at the heat generating parts 40 formed on one of the second inclined surfaces 31*d*. The auxiliary resistor layer 42 is formed of a metal such as titanium with excellent adhesion. The one of the second inclined surfaces 31*d* faces an external electrode 47 with the convex part 31*b* therebetween. The heat generating parts 40 are not limited to one of the second inclined surfaces 31*d*, and may be formed on at least any one of the top surface 31*e* of the convex part 31*b*, the other of the second inclined surfaces 31*d*, and the two first inclined surfaces 31*c*.

A wiring layer 43 covers the auxiliary resistor layer 42 such that the auxiliary resistor layer 42 is exposed at the plurality of heat generating parts 40. The plurality of heat generating parts 40 each have a rectangular planar shape and are arranged along the direction from the front to the back in FIG. 10. The wiring layer 43 is made of a metal such as copper that is excellent in electrical conduction. The wiring layer 43 has independent wiring connected to each of the plurality of heat generating parts 40. The wiring layer 43 transmits a current supplied from the external electrode 47, and supplies the current to the auxiliary resistor layer 42 exposed at the plurality of heat generating parts 40 from both sides via the independent wiring. The current supplied from the wiring layer 43 to the auxiliary resistor layer 42 is supplied to the exposed resistor layer 41 from both sides from the exposed auxiliary resistor layer 42 at the heat generating parts 40.

A protective layer 45 is made of an insulator such as silicon nitride and is formed on the main surface 31*a* of the head substrate 31 so as to cover the resistor layer 41, the auxiliary resistor layer 42, and the wiring layer 43. The protective layer 45 may be made of other insulators such as silicon oxide. The external electrode 47 is exposed on the protective layer 45 and is connected to the wiring layer 43 by passing through the protective layer 45.

The head substrate 31 is usually fixed to a heat sink (not shown). The heat sink is a fixing member to which the head substrate 31 is attached. The heat sink is formed of a metal plate (for example, an aluminum plates, a steel plate, or the like).

The thermal print head 30 is fixed to a mounting member (not shown) included in a thermal printer 130, by means of screw fastening or the like. The thermal printer 130 has a roller-shaped platen 101. The platen 101 extends along the direction in which the plurality of heat generating parts 40 of the thermal print head 30 extend side by side (the direction from the front to the back in FIG. 10) and is arranged to face the plurality of heat generating parts 40. When the thermal printer 130 is used, a printing medium 102

(for example, thermal paper or the like) is arranged between the platen 101 and the plurality of heat generating parts 40. The printing medium 102 pressed against the platen 101 moves while being in contact with the plurality of heat generating parts 40. The printing medium 102 moves from the right side to the left side in FIG. 10. A flat platen (including a platen having a curved surface of a large radius of curvature) may be used instead of the roller-shaped platen 101.

Figure 11:
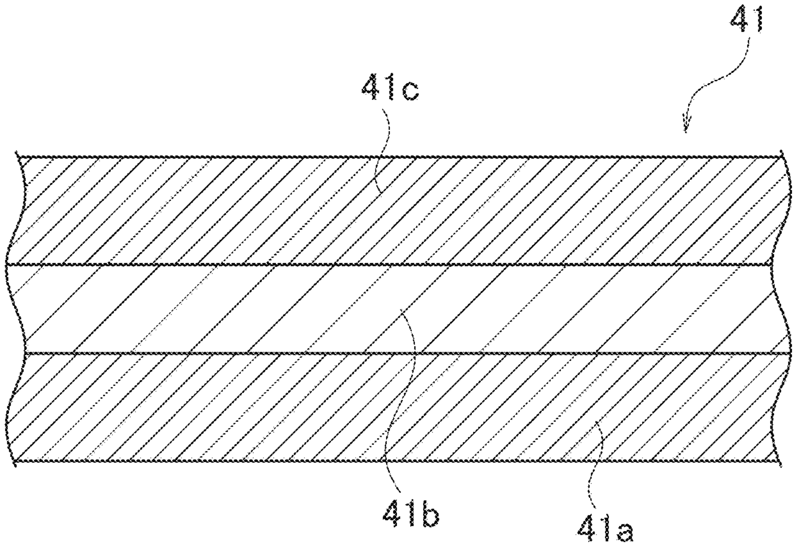
FIG. 11 is a cross-sectional view of a resistor layer of a second embodiment.

As shown in FIG. 11, in the thermal print head 30 of the second embodiment, the resistor layer 41 is formed by stacking a first sub-resistor layer 41*a* containing tantalum nitride, a main resistor layer 41*b* containing tantalum, and a second sub-resistor layer 41*c* containing tantalum nitride in this order. Tantalum contained in the main resistor layer 41*b* has a body-centered cubic lattice structure (BCC) and may contain extremely a low concentration of nitrogen. Tantalum nitride contained in the first and second sub-resistor layers 41*a* and 41*c* contains an eutectic crystal having a (111)- and (200)-oriented face-centered cubic lattice structure (FCC).

In the resistor layer 41, the main resistor layer 41*b* has a low resistivity, is a major electrical conduction path, and is a dominant factor of the electrical characteristics of the resistor layer 41. In addition, since the main resistor layer 41*b* contains an extremely low concentration of nitrogen, the main resistor layer 41*b* has excellent ductility. Therefore, the main resistor layer 41*b* is not easily disconnected even if a large current is intermittently applied to the main resistor layer 41*b* in order to heat the heat generating parts 40 and the cycle of expansion and contraction is repeated.

In the resistor layer 41, the main resistor layer 41*b* is stacked on and electrically connected to the first and second sub-resistor layers 41*a* and 41*c*. Therefore, even if the main resistor layer 41*b*, which is the major electrical conduction path, is disconnected, electrical conduction is maintained through the first and second sub-resistor layers 41*a* and 41*c*. Therefore, the entire resistor layer 41 is not easily disconnected.

The resistor layer 41 is formed on the insulating layer 32 covering the head substrate 31, and a part of the resistor layer 41 is covered by the protective layer 45. The head substrate 31 is made of a semiconductor, but an oxygen-containing material such as silicon oxide ($SiO_2$) is used for forming the insulating layer 32. Also, although the protective layer 45 is made of an insulator such as silicon nitride (SiN), an oxygen-containing material such as silicon oxide ($SiO_2$) is sometimes used to form the protective layer 45. Oxygen atoms may enter the resistor layer 41 from such oxygen-containing materials.

In the resistor layer 41, the first sub-resistor layer 41*a* is interposed between the insulating layer 32 and the main resistor layer 41*b* and protects the main resistor layer 41*b* from being affected by the insulating layer 32. Suppose that oxygen atoms enter the resistor layer 41 from the insulating layer 32 which is made of an oxygen-containing material such as silicon oxide, for example. Even in the above case, the first sub-resistor layer 41*a* acts as a barrier to retain oxygen atoms in the first sub-resistor layer 41*a* and prevents oxygen atoms from reaching the main resistor layer 41*b*.

The second sub-resistor layer 41*c* is interposed between the protective layer 45 and the main resistor layer 41*b* and protects the main resistor layer 21*b* from being affected by the protective layer 45. Suppose that the protective layer 45 is made of an oxygen-containing material such as silicon oxide, and oxygen atoms enter the resistor layer 41 from the protective layer 45. Even in the above case, the second sub-resistor layer 41*c* acts as a barrier to retain oxygen atoms in the second sub-resistor layer 41*c* and prevents oxygen atoms from reaching the main resistor layer 41*b*.

Even if oxygen atoms enter the resistor layer 41 from the adjacent insulating layer 32 and protective layer 45 in this way, oxygen atoms are retained in the first sub-resistor layer 41*a* or the second sub-resistor layer 41*c* and are prevented from entering the main resistor layer 41*b* which is the dominant factor of the electrical characteristics. Therefore, degradation in the characteristics that occurs due to the entering of oxygen atoms into the main resistor layer 41*b* is reduced, and the electrical characteristics of the thermal print head 30 including the resistor layer 41 are maintained, thereby extending the life of the thermal print head 30. Even if the main resistor layer 41*b* is disconnected, electrical conduction is maintained through the first and second sub-resistor layers 41*a* and 41*c*, thereby extending the life of the thermal print head 30.

Figure 12A:
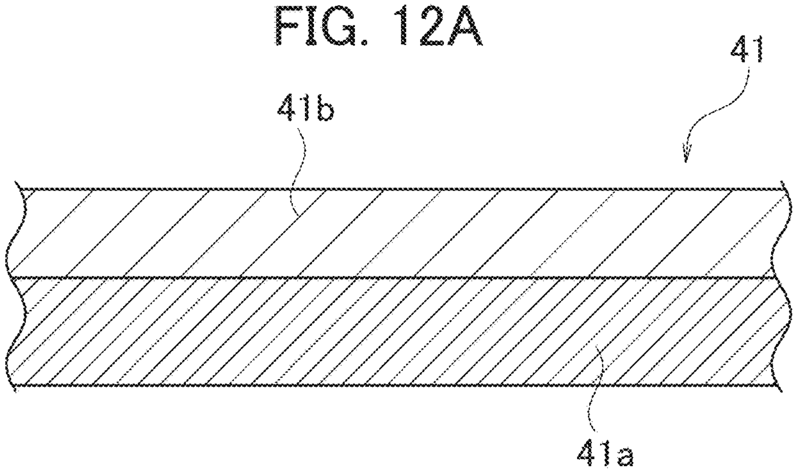
FIGS. 12A and 12B are cross-sectional views showing another aspect of a resistor layer of a second embodiment.
Figure 12B:
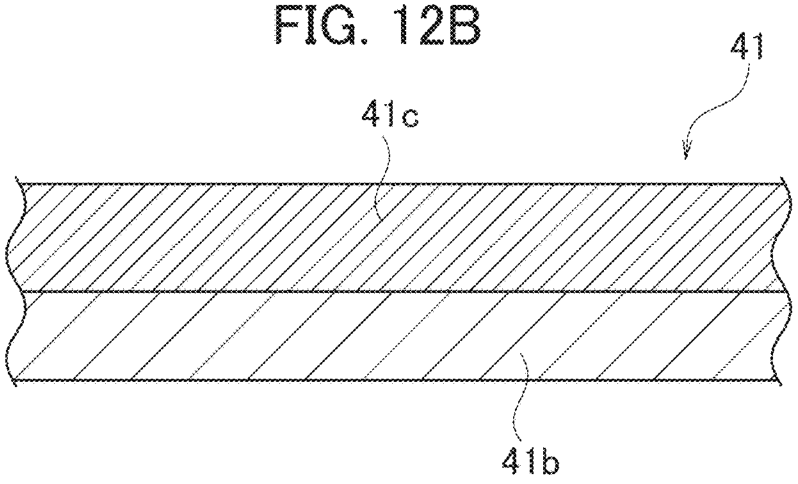

FIGS. 12A and 12B are cross-sectional views showing another aspect of the resistor layer 41. In FIG. 11, the resistor layer 41 is formed by stacking the first sub-resistor layer 41*a*, the main resistor layer 41*b*, and the sub-resistor layer 41*c* in this order. However, the structure of the resistor layer 41 is not limited to the above. The first and second sub-resistor layers 41*a* and 41*c* may be provided only on one side where oxygen atoms may enter the resistor layer 41 from an adjacent layer.

FIG. 12A is a cross-sectional view showing the resistor layer 41 formed by stacking the main resistor layer 41*b* on the first sub-resistor layer 41*a*. Suppose that the insulating layer 32 (see FIG. 10) is made of silicon oxide ($SiO_2$) containing oxygen and the protective layer 45 (see FIG. 10) is made of silicon nitride (SiN) containing no oxygen, for example. In the above case, although oxygen atoms may enter the resistor layer 41 from the insulating layer 32, no oxygen atoms are supplied from the protective layer 45. Therefore, as a barrier to prevent oxygen atoms from entering the main resistor layer 21*b*, it is sufficient if the first sub-resistor layer 41*a* is provided so as to be interposed between the insulating layer 32 and the main resistor layer 41*b*. The main resistor layer 41*b* may be directly in contact with the protective layer 45 without the second sub-resistor layer 41*c* therebetween.

In such a case, even if oxygen atoms enter the resistor layer 41 from the insulating layer 32, oxygen atoms are retained in the first sub-resistor layer 41*a* and prevented from reaching the main resistor layer 41*b* which is the dominant factor of the electrical characteristics. Therefore, the electrical characteristics of the thermal print head 30 including the resistor layer 41 are maintained, thereby extending the life of the thermal print head 30.

FIG. 12B is a cross-sectional view showing the resistor layer 41 formed by stacking the second sub-resistor layer 41*c* on the main resistor layer 41*b*. Suppose that the insulating layer 32 (see FIG. 10) is made of silicon nitride (SiN) containing no oxygen and the protective layer 45 (see FIG. 10) is made of silicon oxide ($SiO_2$) containing oxygen, for example. In the above case, although no oxygen atoms are supplied from the head substrate 31, oxygen atoms may enter the resistor layer 41 from the protective layer 45. Therefore, as a barrier to prevent oxygen atoms from entering the main resistor layer 41*b*, it is sufficient if the second sub-resistor layer 41*c* is provided so as to be interposed between the main resistor layer 41*b* and the protective layer 45. The main resistor layer 41*b* may directly contact the insulating layer 32 without the first sub-resistor layer 41*a* therebetween.

In such a case, even if oxygen atoms enter the resistor layer 41 from the protective layer 45, oxygen atoms are retained in the second sub-resistor layer 41*c* and prevented from reaching the main resistor layer 41*b* which is the dominant factor of the electrical characteristics. Therefore, the electrical characteristics of the thermal print head 30, including the resistor layer 41 are maintained, thereby extending the life of the thermal print head 30.

Even if the resistor layer 41 is formed by stacking only one of the first and second sub-resistor layers 41*a* and 41*c* on the main resistor layer 41*b*, the main resistor layer 41*b* is electrically connected to one of the first and second sub-resistor layers 41*a* and 41*c*. Therefore, even if the main resistor layer 41*b* which is the major electrical conduction path is disconnected, electrical conduction is maintained through one of the first and second sub-resistor layer 41*a* and 41*c*. For this reason, the entire resistor layer 21 is not easily disconnected and the life of the thermal print head including the resistor layer 21 is extended.

The thermal printer 130 may be configured by incorporating the thermal print head 30 of the second embodiment. This kind of thermal printer 130 has the thermal print head 30 and the platen 101 arranged to face the heat generating parts 40 of the thermal print head 30. Since the life of the thermal print head 30 of the second embodiment is extended, the life of the thermal printer 130 configured by incorporating this kind of thermal print head 30 can also be extended.

Figure 13:
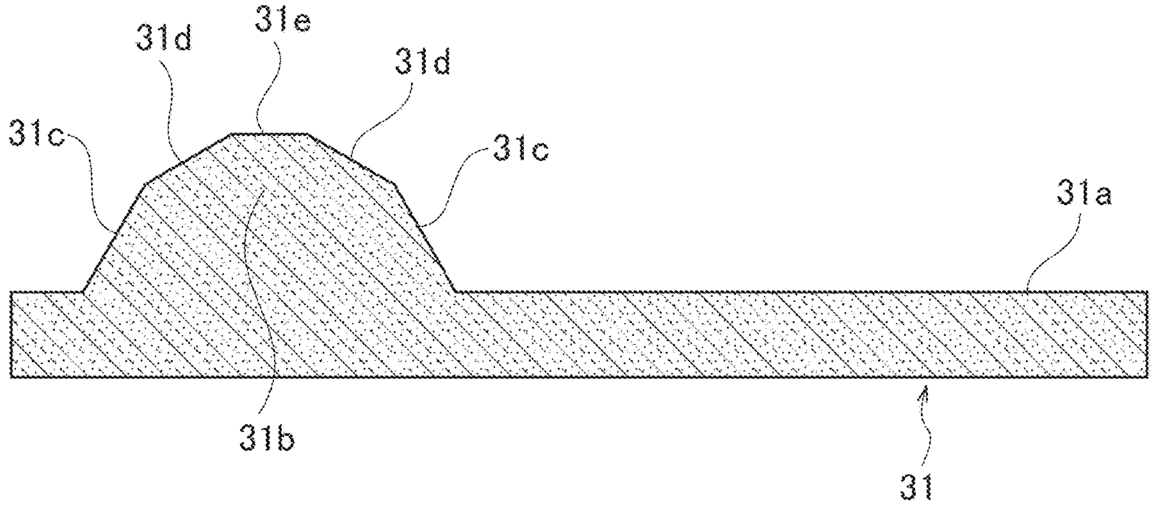
FIG. 13 is a process flow diagram of a thermal print head of a second embodiment.
Figure 14:
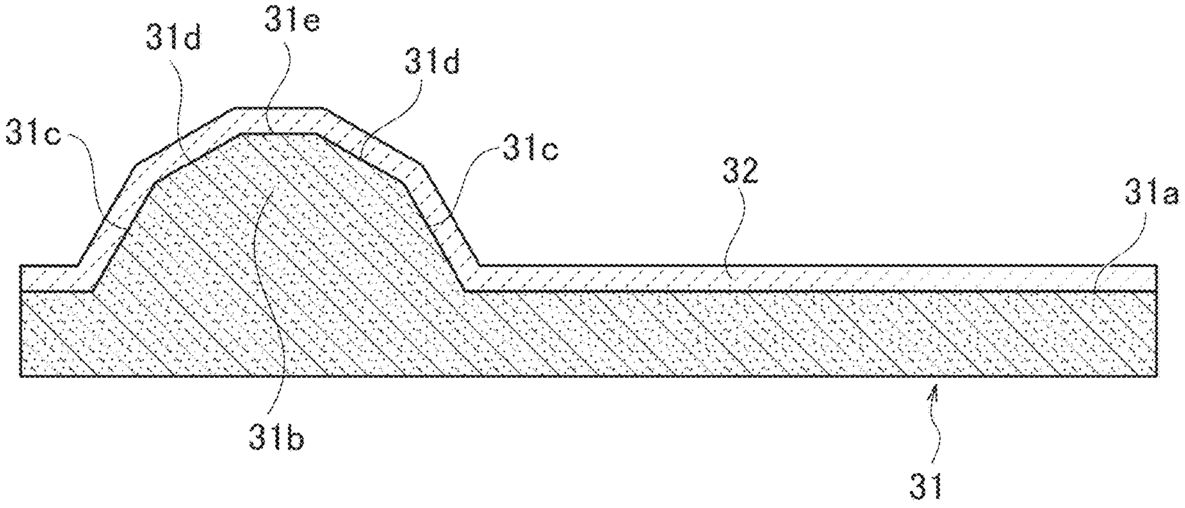
FIG. 14 is a process flow diagram of a thermal print head of a second embodiment.
Figure 15:
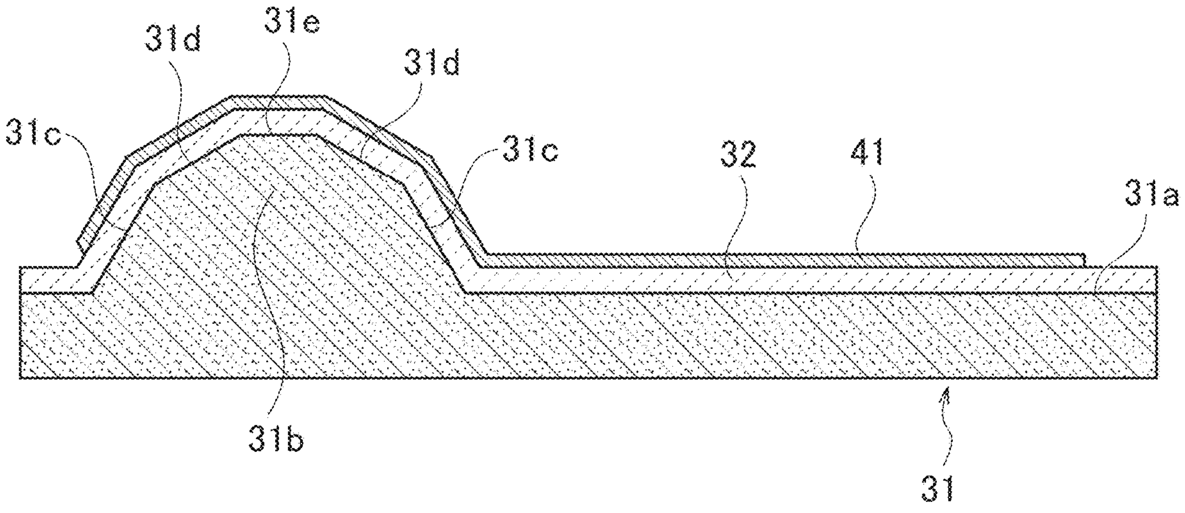
FIG. 15 is a process flow diagram of a thermal print head of a second embodiment.

FIGS. 13 to 15 are process flow diagrams of the thermal print head 30 of the second embodiment. FIGS. 13 to 15 show one head substrate 31 corresponding to one thermal print head 30. In practice, a silicon substrate having a nearly circular planar shape has a plurality of head substrates 31 in a lattice shape, for example. In other words, a silicon substrate is a silicon wafer.

In the process shown in FIG. 13, the head substrate 31 made of a semiconductor such as silicon is provided. The convex part 31*b* extending in one direction is formed on the main surface 31*a* of the head substrate 31 by means of anisotropic etching. The convex part 31*b* is sandwiched from both sides by first inclined surfaces 31*c* in contact with the main surface 31*a* and second inclined surfaces 31*d* formed between the first inclined surfaces 31*c* and the top surface 31*e* of the convex part 31*b*. Other types of semiconductors such as silicon carbide may be used instead of silicon for forming the head substrate 31. The silicon may also be doped with appropriate impurities.

In the process shown in FIG. 14, the insulating layer 32 made of silicon oxide is formed on the main surface 31*a* and the convex part 31*b* of the head substrate 31. Other types of insulators such as silicon nitride may be used instead of silicon oxide for forming the insulating layer 32.

In the process shown in FIG. 15, the resistor layer 41 is formed on the insulating layer 32, across the main surface 31*a* and the convex part 31*b* of the head substrate 31. As shown in FIG. 11, the resistor layer 41 is formed by stacking the first sub-resistor layer 41*a*, the main resistor layer 41*b*, and the second sub-resistor layer 41*c* in this order.

In this process, the head substrate 31 in which the insulating layer 32 is formed on the main surface 31*a* and the convex part 31*b* in the process shown in FIG. 14 is stored in a chamber. A mixed gas of a nitrogen gas of a raw material gas and an argon gas of a carrier gas flows into the chamber. Then, tantalum as a target is sputtered and tantalum nitride is deposited on the insulating layer 32. The first and second sub-resistor layers 41*a* and 41*c* containing a high concentration of nitrogen are deposited by adjusting the flow rate of a nitrogen gas in a mixed gas to increase. In addition, the supply of a nitrogen gas is stopped, only an argon gas is flown to sputter tantalum, and the main resistor layer 41*b* is deposited. When sputtering is performed, the flow rate of a nitrogen gas is adjusted in the order of depositing, such that the first sub-resistor layer 41*a*, the main resistor layer 41*b*, and the second sub-resistor layer 41*c* are deposited in this order while the head substrate 31 is stored in the chamber. Therefore, in the process of depositing the main resistor layer 41*b*, a nitrogen gas flown in the process of depositing the first sub-resistor layer 41*a* may remain in the chamber, and the main resistor layer 41*b* may contain an extremely low concentration of nitrogen.

FIG. 6 described above is a graph showing the relationship between nitrogen content, the tantalum nitride resistivity, and an in-plane variation of the tantalum nitride resistivity for tantalum nitride deposited by means of sputtering. Curve a in the drawing is the tantalum nitride resistivity, and curve b is the in-plane variation of the tantalum nitride resistivity.

The nitrogen content of deposited tantalum nitride increases in accordance with the flow rate of a nitrogen gas. The nitrogen content of the horizontal axis can be replaced by the flow rate of a nitrogen gas. The resistivity shown by curve a increases as the nitrogen content or a nitrogen gas flow rate increases. Meanwhile, the in-plane variation of the resistivity shown by curve b decreases as the flow rate of a nitrogen gas or the nitrogen content increases.

In the diagram, the first region R1 containing a low concentration of nitrogen corresponds to the main resistor layer 21*a* containing tantalum in the resistor layer 21. The first region R1 has a low resistivity and is used to generate heat by causing a large current to flow in the heat generating parts 40, but the in-plane variation of the resistivity increases. In this first region R1, tantalum nitride is deposited in an unstable structure such as a body-centered cubic lattice structure. Meanwhile, the second region R2 containing a high concentration of nitrogen exceeding a predetermined concentration of nitrogen corresponds to the first sub-resistor layer 21*b* and the second sub-resistor layer 21*c* containing tantalum nitride of the resistor layer 21. In the second region R2, the in-plane variation of the resistivity is small, and tantalum nitride is deposited in a stable structure such as an eutectic crystal having a (111)- and (200)-oriented face-centered cubic lattice structure, but the resistivity is high. Therefore, the second region R2 is not suitable to be used for generating heat by causing a large current to flow therethrough.

FIG. 7 describe above is a graph showing the relationship between nitrogen content and pressure resistance for tantalum nitride deposited by means of sputtering. This pressure resistance was measured by means of a step stress test (SST). The pressure resistance decreases as nitrogen content increases. If the pressure resistance of the usable third region R3 in the drawing is assumed to be 0.11 mJ or more, the corresponding usable nitrogen content is about 22 atm % or less.

According to the second embodiment, as shown in FIG. 11, the resistor layer 41 is formed by stacking the first sub-resistor layer 41*a*, the main resistor layer 41*b*, and the second sub-resistor layer 41*c* in this order. Tantalum nitride contained in the first and second sub-resistor layers 41*a* and 41*c* is in a stable state in which the concentration of nitrogen contained exceeds a predetermined value, and the range of nitrogen content may be in the region R2 in FIG. 6. In this region R2, tantalum nitride is deposited into a stable structure including an eutectic crystal having a (111)- and (200)-oriented face-centered cubic lattice structure.

In addition, the main resistor layer 41*b* is made of tantalum which may contain an extremely low concentration of nitrogen, and the range of nitrogen content may be in the first region R1 of FIG. 6 or in the lower nitrogen content range. In the first region R1 and in the lower nitrogen content range, the variation of resistivity is large, and tantalum nitride is deposited in an unstable structure. Although the main resistor layer 41*b* is deposited in an unstable structure in this way, the main resistor layer 41*b* is stacked between the first and second sub-resistor layers 41*a* and 41*c* which have stable structures. Therefore, the first sub-resistor layer 41*a*, the main resistor layer 41*b*, and the second sub-resistor layer 41*c*, which constitute the resistor layer 41, as a whole form a stable structure.

The main resistor layer 41*b* among the first sub-resistor layer 41*a*, the main resistor layer 41*b*, and the second sub-resistor layer 41*c*, which constitute the resistor layer 41, has a low resistivity, is the major electrical conduction path, and is the dominant factor of the electrical characteristics of the resistor layer 41. The main resistor layer 41*b* is made of tantalum which may contain an extremely low concentration of nitrogen. Therefore, the nitrogen concentration corresponds to the usable third region R3 shown in FIG. 7. This ensures the pressure resistance of the thermal print head 30 including the resistor layer 41.

As in another aspect of the resistor layer 21 shown in FIGS. 12A and 12B, the resistor layer 41 may be formed by stacking the main resistor layer 41*b* and only one of the first and second sub-resistor layers 41*a* and 41*c*. That is, the resistor layer 41 may be formed by stacking the main resistor layer 41*b* on the first sub-resistor layer 41*a* as shown in FIG. 12A. Alternatively, the resistor layer 41 may be formed by stacking the second sub-resistor layer 41*c* on the main resistor layer 41*b* as shown in FIG. 12B.

In such a case also, the head substrate 31 in which the insulating layer 32 is formed on the main surface 31*a* and the convex part 31*b* is stored in a chamber. A mixed gas of a nitrogen gas of a raw material gas and an argon gas of a carrier gas is flown into the chamber. Tantalum as a target is sputtered and tantalum nitride is deposited on the insulating layer 32. The first sub-resistor layer 41*a* or the second sub-resistor layer 41*c* containing a high concentration of nitrogen is deposited by adjusting the flow rate of a nitrogen gas in a mixed gas to increase. In addition, the supply of a nitrogen gas is stopped, only an argon gas is flown to sputter tantalum, and the main resistor layer 41*b* is deposited. In these operations, when sputtering is performed, the flow rate of a nitrogen gas is adjusted such that the main resistor layer 41*b* and one of the first and second sub-resistor layers 41*a* and 41*c* are deposited in a predetermined order while the head substrate 31 is stored in the chamber.

Tantalum nitride contained in one of the first and second sub-resistor layers 41*a* and 41*c* of the resistor layer 41 is in a stable state in which the concentration of nitrogen contained exceeds a predetermined value, and the range of nitrogen content may be in the region R2 in FIG. 6. In this region R2, tantalum nitride is deposited into a stable structure including an eutectic crystal having a (111)- and (200)-oriented face-centered cubic lattice structure.

The tantalum layer 41*b* is made of tantalum which may contain an extremely low concentration of nitrogen, and the range of nitrogen content may be in the first region R1 of FIG. 6 or in the lower nitrogen content range. In the first region R1 and in the lower nitrogen content range, the variation of resistivity is large, and tantalum nitride is deposited in an unstable structure. Although the main resistor layer 41*b* is deposited in an unstable structure in this way, the main resistor layer 41*b* is stacked with one of the first and second sub-resistor layers 41*a* and 41*c* which have stable structures. Therefore, the main resistor layer 21*b* and one of the first and second sub-resistor layers 41*a* and 41*c*, which constitute the resistor layer 41, as a whole form a stable structure.

Figure 16:
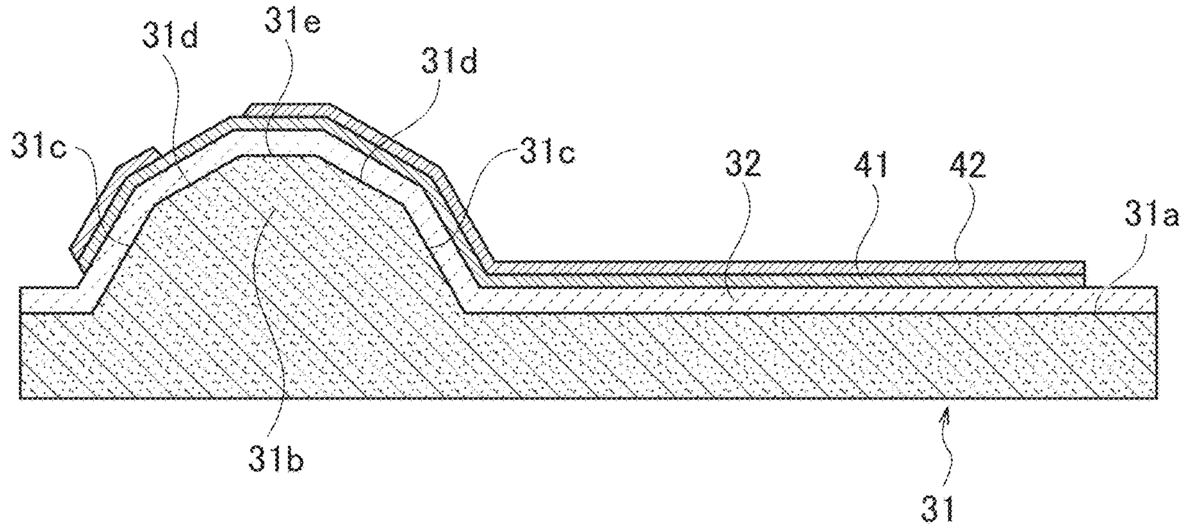
FIG. 16 is a process flow diagram of a thermal print head of a second embodiment.
Figure 17:
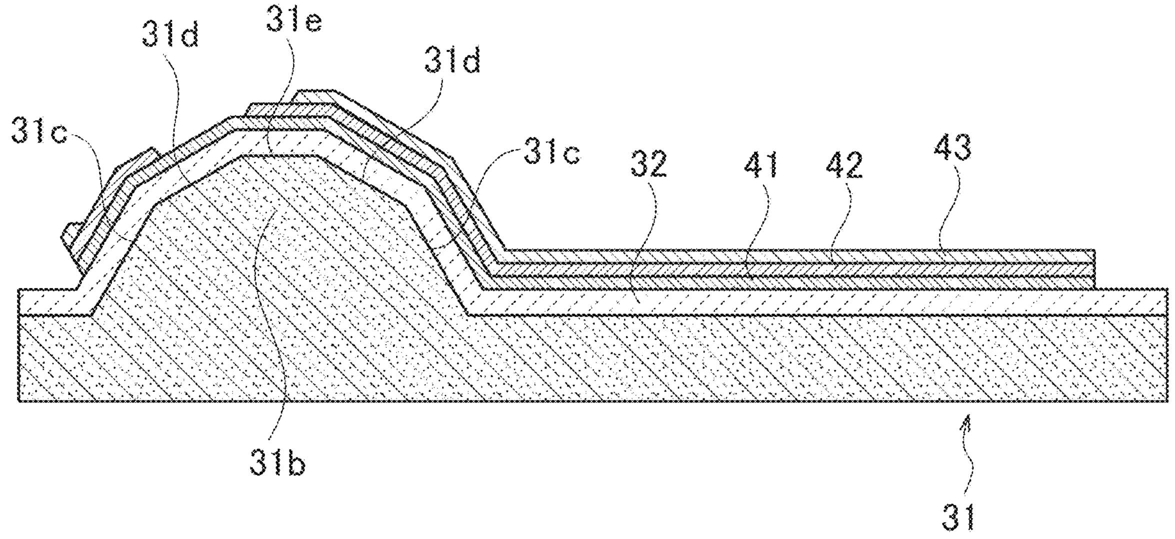
FIG. 17 is a process flow diagram of a thermal print head of a second embodiment.
Figure 18:
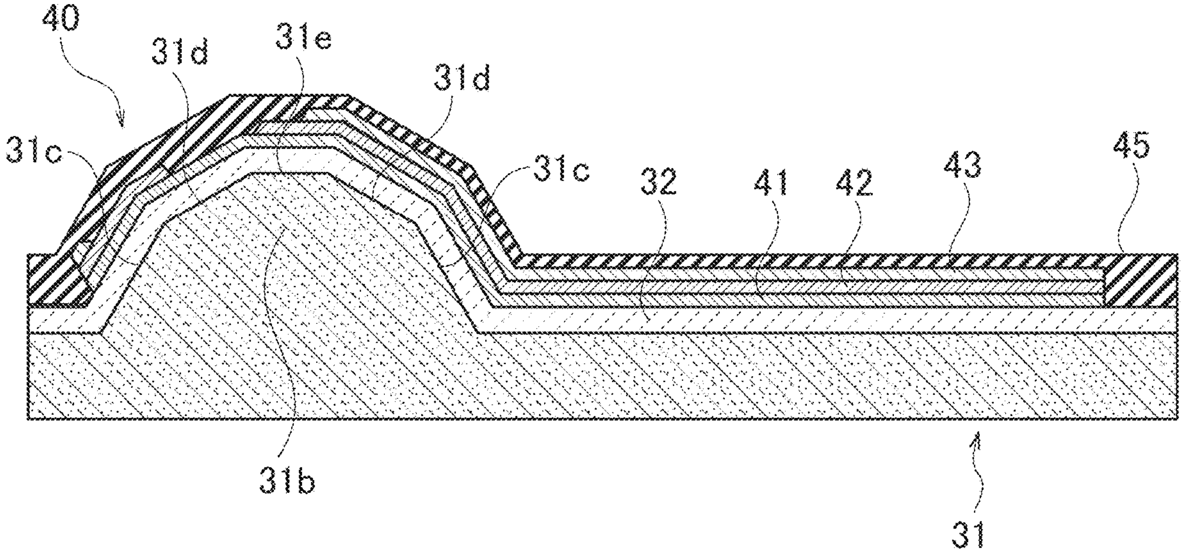
FIG. 18 is a process flow diagram of a thermal print head of a second embodiment.

FIGS. 16 to 18 are process flow diagrams of the thermal print head 30 of the second embodiment. FIGS. 16 to 18 follow on from the process flow shown in FIGS. 13 to 15. In the process shown in FIG. 16, the auxiliary resistor layer 42 is formed to cover the resistor layer 41 which is formed on the insulating layer 32 across the main surface 31*a* and the convex part 31*b* of the head substrate 31. The auxiliary resistor layer 42 is formed of a metal such as titanium with excellent adhesion.

In the process shown in FIG. 17, the wiring layer 43 is formed to cover the auxiliary resistor layer 42. The wiring layer 22 is stopped at one of the second inclined surfaces 31*d* of the convex part 31*b* so that the resistor layer 41 is exposed at the heat generating parts 40. The wiring layer 43 is made of a metal such as copper that is excellent in electrical conduction. The wiring layer 43 is stopped at one of the second inclined surfaces 31*d* of the convex part 31*b* and the exposed resistor layer 41 and auxiliary resistor layer 42 form the heat generating parts 40.

In the process shown in FIG. 18, the protective layer 45 is formed on the main surface 31*a* and the convex part 31*b* of the head substrate 31 and covers the resistor layer 41, the auxiliary resistor layer 42, and the wiring layer 43. The protective layer 45 is made of an insulator such as silicon nitride. The protective layer 45 may be made of other insulators such as silicon oxide. Following on from the process shown in FIG. 18, the external electrode 47 is formed as shown in FIG. 10. Further, an individual thermal print head 30 is obtained through a process such as dicing (not shown). The plurality of head substrates 31 are fabricated from a silicon substrate having a nearly circular planar shape by means of the process such as dicing.

In the process of forming the resistor layer 41 shown in FIG. 15 of the manufacturing method of the thermal print head 30 of the second embodiment, tantalum as a target is sputtered and the nitrogen content is controlled by appropriately controlling the flow rate of a nitrogen gas supplied to the chamber. Compared with the conventional process of forming a resistor by means of sputtering, it is possible to perform the process easily because it is sufficient if an operation of appropriately controlling the flow rate of nitrogen is added.

EXPERIMENTAL EXAMPLE

Figure 19:
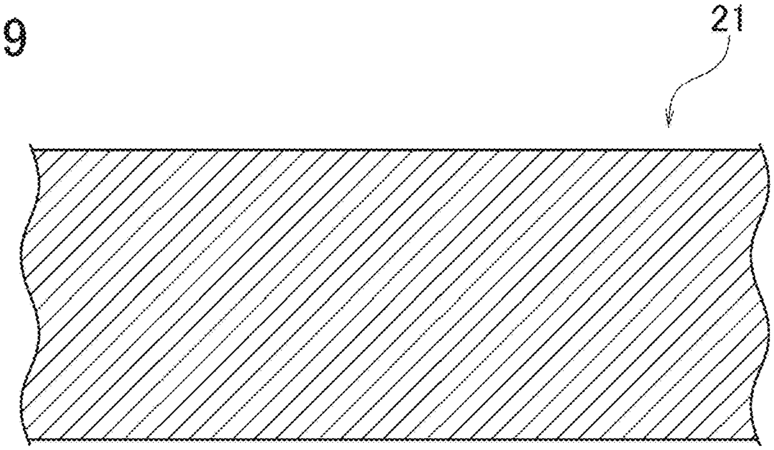
FIG. 19 is a cross-sectional view of a resistor layer of an experimental example.

An experimental example compared with the first and second embodiments described above will be described. In this experimental example, the resistor layer 41 of the thermal print head 30 of the second embodiment shown in FIG. 10 is replaced by a uniform tantalum nitride layer as shown in FIG. 19. In this experimental example, the members common to the thermal printer 130 of the second embodiment are denoted by the same reference numerals.

Tantalum nitride of the resistor layer 41 in the experimental example has nitrogen content such that the resistivity can be kept small to cause a large current to flow in the heat generating parts 40. The nitrogen content corresponds to the first region R1 having the low resistivity shown by curve a in the graph showing the relationship between nitrogen content, the resistivity, and the in-plane variation of resistivity shown in FIG. 6. In this first region R1, the nitrogen concentration is a predetermined value or less, that is, the nitrogen concentration is relatively low, and the resistivity is small, but the in-plane variation of the resistivity shown by curve b is large, indicating that the structure of the deposited tantalum nitride is unstable.

Figure 20A:
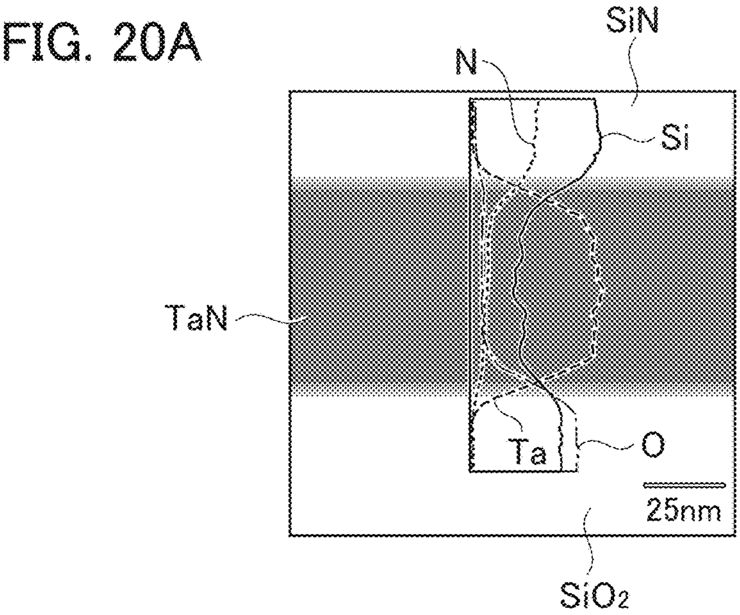
FIGS. 20A and 20B are diagrams showing a distribution of elements in a resistor layer of an experimental example.
Figure 20B:
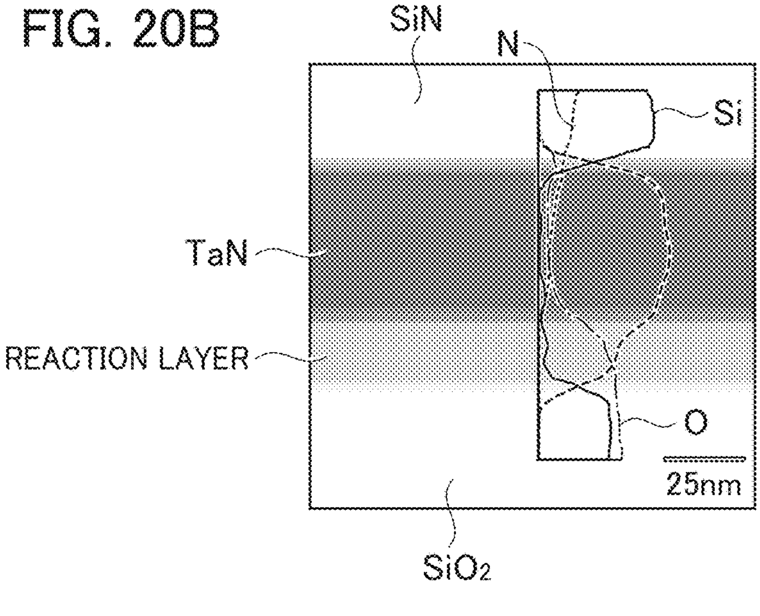

FIGS. 20A and 20B show the distribution of elements in the resistor layer 21 of the experimental example. FIG. 20A shows a state before the pressure-proof test and FIG. 20B shows a state after the pressure-proof test. In these drawings, the distribution of elements in cross sections including a part of the insulating layer 32 stacked below the resistor layer 41 and the protective layer 45 stacked above the resistor layer 41, together with the resistor layer 41 at the heat generating parts 40 of the thermal print head, is measured by means of X-ray spectroscopy.

Referring to the distribution of oxygen before the pressure-proof test in FIG. 20A and after the pressure-proof test in FIG. 20B, it can be observed that after the pressure-proof test, the concentration of nitrogen is decreased and nitrogen is lost from the resistor layer 41 made of tantalum nitride to the protective layer 45 which is made of silicon nitride and is stacked above the resistor layer 41. Further, after the pressure-proof test, it can be observed that oxygen is diffused into the resistor layer 41 made of tantalum nitride from the insulating layer 32 which is made of silicon oxide and is stacked below the resistor layer 41, tantalum is diffused from the resistor layer 41 to the lower layer, and a reaction layer is formed spanning from the resistor layer 41 to the lower layer.

Figure 21:
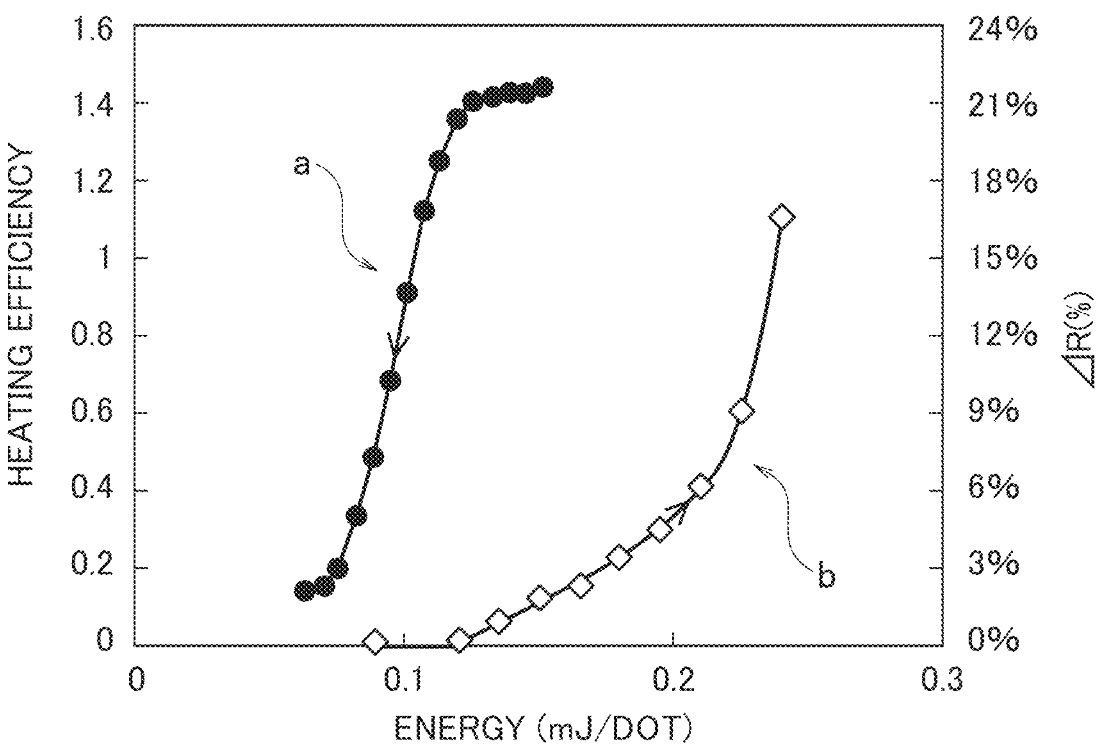
FIG. 21 is a graph showing the relationship between energy, heating efficiency, and the rate of change of resistivity in an experimental example.

FIG. 21 is a graph showing changes in heating efficiency and resistivity due to the pressure-proof test. In the drawing, data line a is the resistivity and data line b is the heating efficiency. These data lines a and b are obtained by repeating the test in the directions of the arrows. As the pressure-proof test steps are repeated, the resistivity increases and the heating efficiency decreases. These changes in characteristics indicate that the resistivity increased because oxygen atoms are diffused into tantalum nitride of the resistor layer 41 and the reaction layer is formed.

INDUSTRIAL APPLICABILITY

The present disclosure can be used for manufacturing a thermal print head and a thermal printer.

What is claimed is:

1. A thermal print head comprising:

a substrate having a main surface on which a convex part is formed;

a resistor layer that is formed on the main surface and the convex part;

a wiring layer that covers the resistor layer such that the resistor layer is exposed at a heat generating part formed at a part of the convex part; and a protective layer that is formed on the main surface of the substrate and covers the resistor layer and the wiring layer, wherein the resistor layer includes:

a main resistor layer that contains tantalum; and at least one of a first sub-resistor layer that contains tantalum nitride and is stacked below the main resistor layer and a second sub-resistor layer that contains tantalum nitride and is stacked on the main resistor layer, and the tantalum nitride contained in the first sub-resistor layer and the second sub-resistor layer has an eutectic crystal having a (111)- and (200)-oriented face-centered cubic lattice structure.

2. The thermal print head according to claim 1, wherein the resistor layer includes both the first sub-resistor layer and the second sub-resistor layer.

3. The thermal print head according to claim 1, wherein the protective layer includes at least one of silicon nitride and silicon oxide.

4. The thermal print head according to claim 1, wherein the wiring layer contains copper.

5. The thermal print head according to claim 1, further comprising:

an auxiliary resistor layer that is stacked between the resistor layer and the wiring layer, wherein the wiring layer covers the auxiliary resistor layer such that the auxiliary resistor layer is exposed at the heat generating part, and the exposed auxiliary resistor layer covers the resistor layer such that the resistor layer is exposed at a part of the auxiliary resistor layer.

6. The thermal print head according to claim 5, wherein the auxiliary resistor layer contains titanium.

7. The thermal print head according to claim 1, wherein the substrate is a ceramic substrate and the convex part is formed by using a glass glaze layer.

8. The thermal print head according to claim 7, wherein the heat generating part is formed in an area including a top of the convex part.

9. The thermal print head according to claim 1, wherein the main resistor layer further contains 22 atm % or less of nitrogen, and the tantalum and the nitrogen contained in the main resistor layer form a body-centered cubic lattice structure.

10. A thermal printer comprising:

the thermal print head according to claim 1; and a platen that is arranged to face a heat generating part of the thermal print head.

11. A manufacturing method of a thermal print head comprising steps of:

providing a substrate having a main surface on which a convex part is formed;

forming a resistor layer that is formed on the main surface and the convex part;

forming a wiring layer that covers the resistor layer such that the resistor layer is exposed at a heat generating part formed at a part of the convex part; and forming a protective layer that is formed on the main surface of the substrate and covers the resistor layer and the wiring layer, wherein the resistor layer includes:

a main resistor layer that contains tantalum; and at least one of a first sub-resistor layer that contains tantalum nitride and is stacked below the main resistor layer and a second sub-resistor layer that is stacked on the main resistor layer, and the tantalum nitride contained in the first sub-resistor layer and the second sub-resistor layer has an eutectic crystal having a (111)- and (200)-oriented face-centered cubic lattice structure.

12. The manufacturing method of a thermal print head according to claim 11, wherein in the step of forming the resistor layer, the main resistor layer and at least one of the first sub-resistor layer and the second sub-resistor layer are deposited by controlling a flow rate of a nitrogen gas in a chamber.

13. The manufacturing method of a thermal print head according to claim 11 comprising:

a step of forming an auxiliary resistor layer so as to be stacked between the resistor layer and the wiring layer before the step of forming the wiring layer and after the step of forming the resistor layer, wherein in the step of forming the wiring layer, the wiring layer covers the auxiliary resistor layer such that the auxiliary resistor layer is exposed at the heat generating part, and in the step of forming the auxiliary resistor layer, the auxiliary resistor layer covers the resistor layer such that the resistor layer is exposed at a part of the exposed auxiliary resistor layer.

14. The manufacturing method of a thermal print head according to claim 11, wherein the step of providing the substrate further includes a step of providing a ceramic substrate and a step of forming a convex part on a main surface of the ceramic substrate by using a glass glaze layer.

15. The manufacturing method of a thermal print head according to claim 11, wherein the step of providing the substrate further includes a step of providing a semiconductor substrate, a step of forming a convex part on a main surface of the semiconductor substrate by means of anisotropic etching, and a step of forming an insulating layer so as to cover the main surface of the substrate on which the convex part is formed and the convex part, in the step of forming the resistor layer, the resistor layer is formed on the insulating layer, and in the step of forming the protective layer, the protective layer is formed so as to cover the insulating layer, the resistor layer, and the wiring layer.

16. The manufacturing method of a thermal print head according to claim 15, wherein the step of forming the convex part further includes a step of forming first inclined surfaces that sandwich a top surface of the convex part from both sides by means of first anisotropic etching, and a step of forming second inclined surfaces between the top surface and the first inclined surfaces by means of second anisotropic etching, and the resistor layer is formed on at least one of the top surface of the convex part, the first inclined surfaces, and the second inclined surfaces.

* * * * *